US007233601B1

(12) United States Patent
Poulter et al.

(10) Patent No.: US 7,233,601 B1
(45) Date of Patent: Jun. 19, 2007

(54) CASCADE ARCHITECTURE AND OPERATION FOR PACKET-BASED COMMUNICATION SYSTEMS

(75) Inventors: Alan R. Poulter, Bedford (GB); Quang T Tran, Hemel Hempstead (GB); Sharon L Wiles, Bovingdon (GB); David J Law, Kempston (GB); Paul J Moran, Hemel Hempstead (GB); Christopher A Walker, Watford (GB)

(73) Assignee: 3Com Corporation, Marlborough, MA (US)

( * ) Notice: Subject to any disclaimer, the term of this patent is extended or adjusted under 35 U.S.C. 154(b) by 956 days.

(21) Appl. No.: 09/662,158

(22) Filed: Sep. 14, 2000

(30) Foreign Application Priority Data

Aug. 1, 2000 (GB) .................. 0018713.8

(51) Int. Cl.
*H04L 12/40* (2006.01)
(52) U.S. Cl. ..................................... 370/439
(58) Field of Classification Search ............... 370/217, 370/218, 221, 222, 224, 249, 403, 404, 405, 370/406, 452, 460, 907
See application file for complete search history.

(56) References Cited

U.S. PATENT DOCUMENTS

| 4,561,088 | A | | 12/1985 | Champlin et al. | |
|---|---|---|---|---|---|
| 5,113,391 | A | * | 5/1992 | Gupta et al. | 370/540 |
| 5,651,003 | A | * | 7/1997 | Pearce et al. | 370/395.71 |
| 6,038,618 | A | * | 3/2000 | Beer et al. | 710/18 |
| 6,314,110 | B1 | * | 11/2001 | Chin et al. | 370/468 |
| 6,327,242 | B1 | * | 12/2001 | Amicangioli et al. | 370/216 |
| 6,330,245 | B1 | * | 12/2001 | Brewer et al. | 370/424 |
| 6,373,840 | B1 | * | 4/2002 | Chen | 370/360 |
| 6,393,026 | B1 | * | 5/2002 | Irwin | 370/401 |
| 6,428,338 | B1 | * | 8/2002 | Yasufuku et al. | 439/310 |

(Continued)

FOREIGN PATENT DOCUMENTS

EP  0158364 A2  10/1985

(Continued)

OTHER PUBLICATIONS

Bay Networks, Installing the BayStack 400-ST1 Cascade Module, pp. 1-38, Nov. 1998.*
3COM, SuperStack 3 Switch 4400 Cascade Module User Guide, pp. 1-7, Mar. 2001.*

*Primary Examiner*—Frank Duong

(57) ABSTRACT

A connecting unit for use in a system comprising a 'stack' of network communication units having a cascade connection has three ports having lines for forwarding and receiving data packets and for forwarding and receiving control messages. The connecting unit increments a first signal value defining an identification number received by way of a control message at a first port, provides the received signal value by way of a control message to the third port and provides the incremented signal value by way of a control message to the second port. The connecting unit also receives a second signal value defining an active unit count by way of a control message at the first port and provides the second signal value, incremented or not in dependence on a control message received at the third port, in a control message at the second port. The first signal values (UnitIDs) are used to establish the numbering of the units in the stack and the second signal values are used to compute a count of the 'active' units in the stack.

31 Claims, 19 Drawing Sheets

U.S. PATENT DOCUMENTS 6,594,231 B1 * 7/2003 Byham et al. ............... 370/223
6,785,286 B1 * 8/2004 O'Keeffe et al. ............ 370/397

FOREIGN PATENT DOCUMENTS

| | | | |
|---|---|---|---|
| EP | 0949789 | * | 10/1999 |
| EP | 0949789 | A1 | 10/1999 |
| GB | 2268668 | A | 1/1994 |
| GB | 2338155 | A | 12/1999 |
| GB | 2350032 | A | 11/2000 |
| GB | 2350530 | A | 11/2000 |
| WO | WO 99/48262 | | 9/1999 |

* cited by examiner

| | 7 | 6 | 5 | 4 | 3 | 2 | 1 | 0 |
|---|---|---|---|---|---|---|---|---|
| Byte 0 | \multicolumn{4}{c}{UnitID[3:0]} | | | | |
| | | | | | Zero | Zero | Active | T-Piece |

| | 7 | 6 | 5 | 4 | 3 | 2 | 1 | 0 |
|---|---|---|---|---|---|---|---|---|
| Byte 1 | AUTotal[3:0] | | | | AUCount[3:0] | | | |

| | 7 | 6 | 5 | 4 | 3 | 2 | 1 | 0 |
|---|---|---|---|---|---|---|---|---|
| Byte 2 | Zero | Zero | Zero | Zero | Zero | Zero | Zero | Zero |

| | 7 | 6 | 5 | 4 | 3 | 2 | 1 | 0 |
|---|---|---|---|---|---|---|---|---|
| Byte 3 | cascSpeed[3:0] | | | | Zero | Zero | Zero | Zero |

CASCADE ARCHITECTURE AND OPERATION FOR PACKET-BASED COMMUNICATION SYSTEMS

FIELD OF THE INVENTION

This invention relates to the cascade connection of a plurality of 'stackable' units for a packet-based data communication system. The invention more particularly relates to both the physical architecture of a cascade and the intercommunication of units which participate in the cascade.

BACKGROUND TO THE INVENTION

The physical elements in a packet-based data communication system include multi-port units such as switches and hubs. Such units are commonly and conveniently manufactured with a fixed plurality of ports by means of which the units are connected by way of appropriate transmission media or links to other units or users. In order to provide greater versatility in constructing the physical layout of networks while minimising the number of different sizes of units that need to be deployed it is common to render the units stackable, by which is meant that a multiplicity of them can be connected to form effectively a single controllable entity. It is customary to make such units physically stackable in a column though this physical aspect is not essential to the meaning of the term stackable or to the present invention.

In order to provide intercommunication between the units, so that for example packets received at the ports of one unit may be forwarded from a port or ports on another unit or units, depending upon the addressing of the packets and the nature of them, it is customary to connect stacked units together by means of a cascade, which is the term used for the communication links and associated control functions by means of which packets are transmitted from one unit to another in the stack. Moreover, the cascade allows users to be connected to any of the units in the stack and allows the stack to be managed as a single logical entity.

The physical connections constituting the cascade need to be such that the direction of transmission of a packet around what is in effect a ring formed by the cascade is properly preserved. Most cascade connections in order that units may obey conventional forwarding rules, allow packets to proceed in only one direction around the ring. Physical connections and adapters must allow for the possibility that a unit becomes inoperative and thereupon to enable the remainder of the units to continue operation. It is also desirable to allow for 'hot' insertion of units in a stack, so that the stack may be augmented by an additional unit or units without requiring reconfiguration or reconnection of all the units in the stack and preferably without requiring a powering down of the existing units of the stack in which 'hot' insertion occurs.

From the operational point of view, the forwarding of packets on the cascade has to be controlled according to a variety of rules, which are intended to conform, for each particular unit, to the forwarding rules relevant for different types of packet (unicast, multicast and broadcast) as well as other relevant rules, such as those relating to bridging. An example of such a rule is preventing the forwarding of a packet out on a port by which it has been received. Such rules may need to be preserved or modified to make the operation of the cascade more convenient or more versatile.

Two variable values which are the basis of the operational control of a stack are a 'unit number', namely some numerical or coded quantity which identifies and distinguishes each physical unit in the stack, and an 'active unit total', which indicates the number of units actually participating in the stack at any time. The unit number is preferably displayed to the user by an LED display on the front panel of a unit. The unit number is conventionally derived from another numerical indication, called herein 'UnitID', by adding one to the latter. Thus the numbering in terms of the 'UnitID' starts at zero whereas the 'unit number' starts at one. Other numbering conventions could be employed. The 'UnitID' may be also relevant for other purposes, such as indicating to other units in a stack the unit which is the source of a packet within the stack. The active unit total is necessary for a variety of purposes, including the control of access of data packets to the cascade and the control of the transfer of data around the cascade.

It is desirable to compute the unit number (in the following example by way of the 'UnitID') of the units in a stack automatically for (for example) display to the user. It is also desirable to be able to compute the active unit total automatically and to convey this information around the cascade to all the units. Owing to the possibility that units in a stack may or may not be operational the number of units in the stack and the active unit total may in general be different The state of the art in relation to cascades is exemplified by GB published patent application number 2338155, which describes a cascade connection in which packets are employed to configure the cascade such that only one unit, called the master, is allowed to place packets on the cascade connection at any time. GB patent application number 9910895.3, filed 12 May 1999, and corresponding US patent application for Byham et al, Ser. No. 09/369,323 (now U.S. Pat. No. 6,594,231) describe an automatic configuration process by means of which the unit which is deemed to be at the bottom of the stack is determined notwithstanding the provision of resilience or possibly misconnection of connecting cables.

SUMMARY OF THE INVENTION

The present invention is, as previously indicated, intended to provide a versatile system of physical connection of a cascade. It is also concerned with an improved manner of transmission of control information which enables control messages to convey around the cascade both stack identification information and active unit count information.

As will become apparent from the later description, the main physical feature of the invention is a three-part connecting unit, specifically a T-piece, which performs the task of incrementing a stack identification value and also an active unit count value, the latter being dependent on the number of active communication units (such as switches) in the stack. The connecting unit is intended to provide a cascade connection for a stack of three communication units or more. Although such a connecting unit is not required for the special case of a stack of only two communication units, a two-unit stack will be described because it is desirable that the devices that cooperate with the three-port connecting unit or units be capable of constituting the special case of a two-high stack. Also, these devices, such as the cascade module and a special cable, as well as the method of transmission of control information, are believed to possess a utility independent of use with the three-port connecting units.

DESCRIPTION OF A PREFERRED EMBODIMENT

Figure 1:
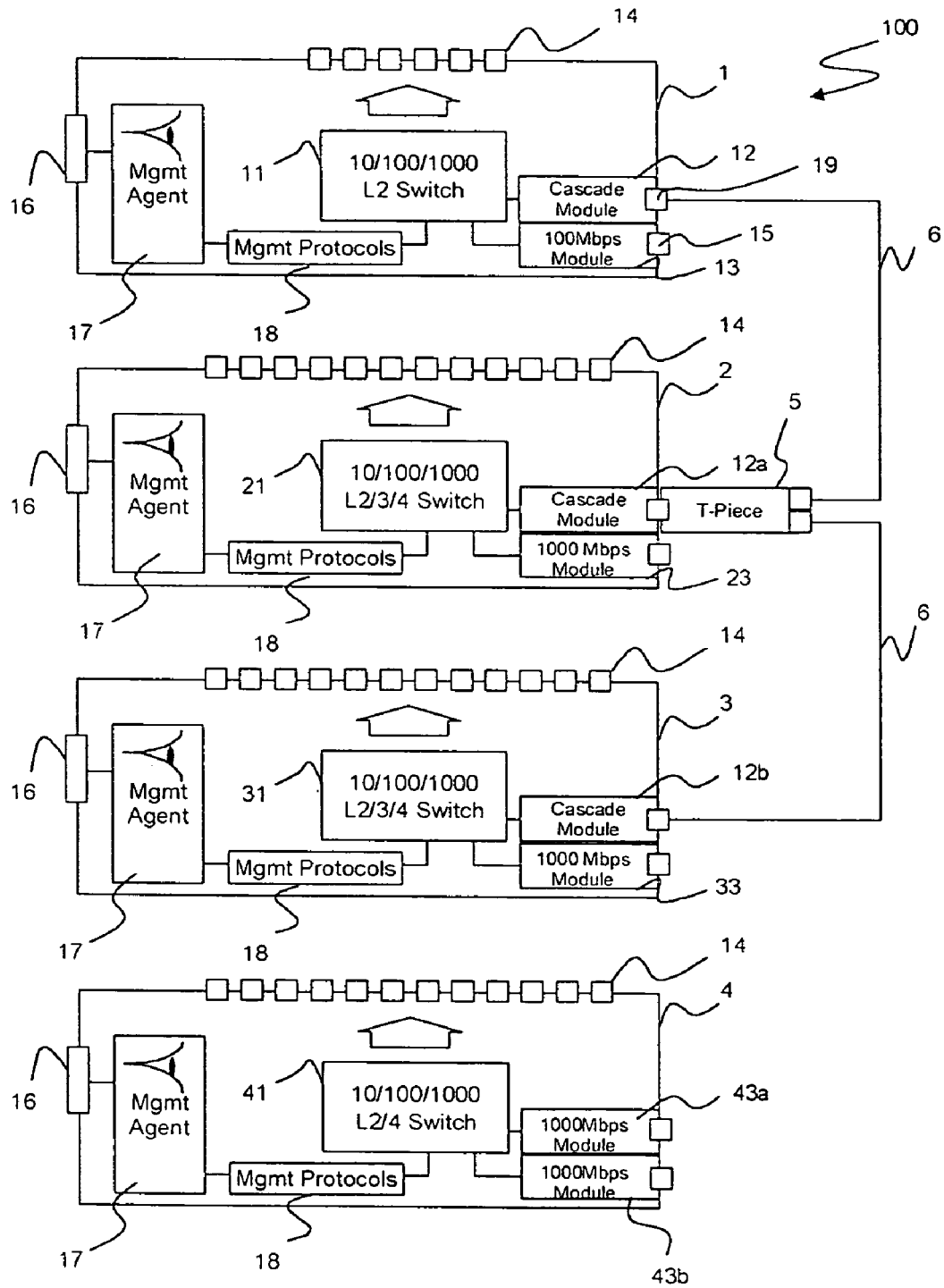
FIG. 1 is a general explanatory diagram of a cascade in accordance with the physical aspects of the present invention.

The following description is of the detailed connections and the manner of operation of a stack of units in general and then more specific terms.

General Introduction

At the top of a physical stack 100 of network units there is a multi-port unit 1. This may include a 'layer 2' switch 11 which may (for example) have 12 or 24 ports. This unit has (in this example) provision for two plug-in modules, a cascade module 12 and a fibre transceiver module 13. Each module occupies a respective slot in the unit 1. The switch has a multiplicity (such as 12) network ports 14 and the transceiver modules has a respective port 15. The unit includes a console 16, and a 'management agent' 17 controlling the switch 11 by way of (schematically illustrated) management protocols 18.

With the exception of the cascade module 12, to be described later, the unit 1 resembles existing units. Accordingly, apart from the cascade module 12 which serves to connect the switch 11 to a cascade by way of a port 19 and cable 6, as described later, the details of the switch will not be described.

The second unit 2 includes (for example) a 12 port Layer 2/3/4 switch 21 and also has two slots for plug-in modules. One slot is occupied by a cascade module 12a. The other slot has a 1000 Mbps transceiver module 23 installed. Since this unit 2 is in the middle of the stack the cascade module 12a couples to a connector 5, hereinafter called 'T-piece' fitted to it. This T-piece 5 connects the cascade module 12a with other units to a stack and will be more particularly described later.

The third unit 3 includes (for example) a 24 port Layer 2/3/4 switch 31 and two slots for plug-in modules. The first slot contains a cascade module 12b similar to modules 12 and 12a. The other slot contains a 1000 Mbps transceiver module 33.

The fourth unit 4 includes (for example) a 24 port Layer 2/4 switch 41 and two slots for plug-in modules. Both slots have 1000 Mbps transceiver modules 43a, 43b installed. Because both of the slots are in use, this unit cannot be connected with other units in the stack.

As will become apparent, the invention is primarily concerned with providing physical and control connection of a stack comprising at least three units, in a manner which is compatible with a two-unit stack and which allows the stack to accommodate inoperative units and hot insertion of units, allowing the computation and indication the unit identification numbers and the active unit total. The important aspects of the preferred embodiment of the invention are the T-piece 5, the cascade module 12, the cable which enables proper configuration of a two-unit stack and the generation and transmission of the control data, all of which are described in the following.

It is desirable that the cascade will continue to function when a single unit is powered down and is resilient to the hot insertion of units. Thus for example the unit 4 may be made a member of the cascade by inserting a T-piece on cascade module 12 of unit 3 and connecting the new T-piece to the port of the cascade module inserted in unit 4 in place of transceiver module 43a. Further, considering the existing configuration, if any one of the units 1, 2 or 3 should fail or be powered down, the other two are intended to continue as an operational stack connected by the cascade.

A cascade module such as module 12 provides a single cascade port. When a stack of two units is being built it is a simple matter of installing a cascade module 12 in each of the two units and connecting the two modules together with a cascade cable 6. The cascade cable is identified (for example by visible indications), 'up' and 'down'. As will be explained later, a cascade module cooperates with the cable in a two-unit stack to determine which unit is at the 'bottom' of the stack. Correct installation of the cable will ensure the correct unit numbering and bottom of stack identification.

Figure 2:
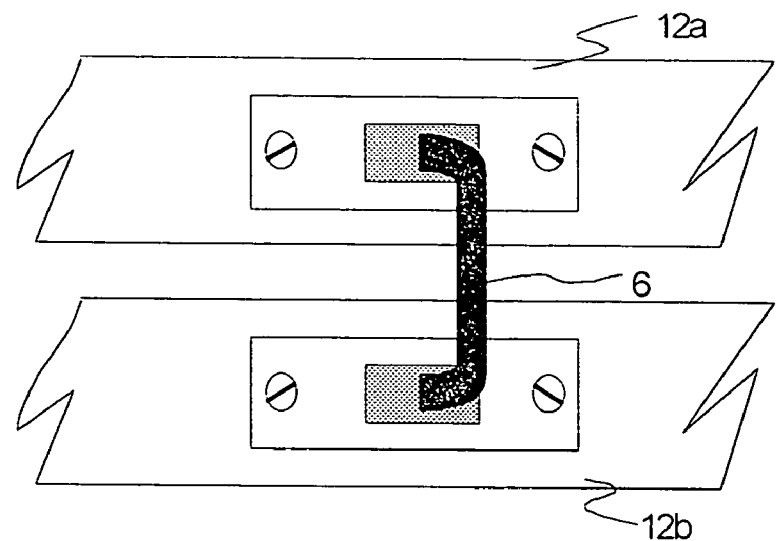
FIG. 2 illustrates a specific form of connection for two units in a stack.

A stack of two is illustrated in FIG. 2. The cable 6 connects the single port of cascade module 12a with the single port of cascade module 12b.

Figure 3:
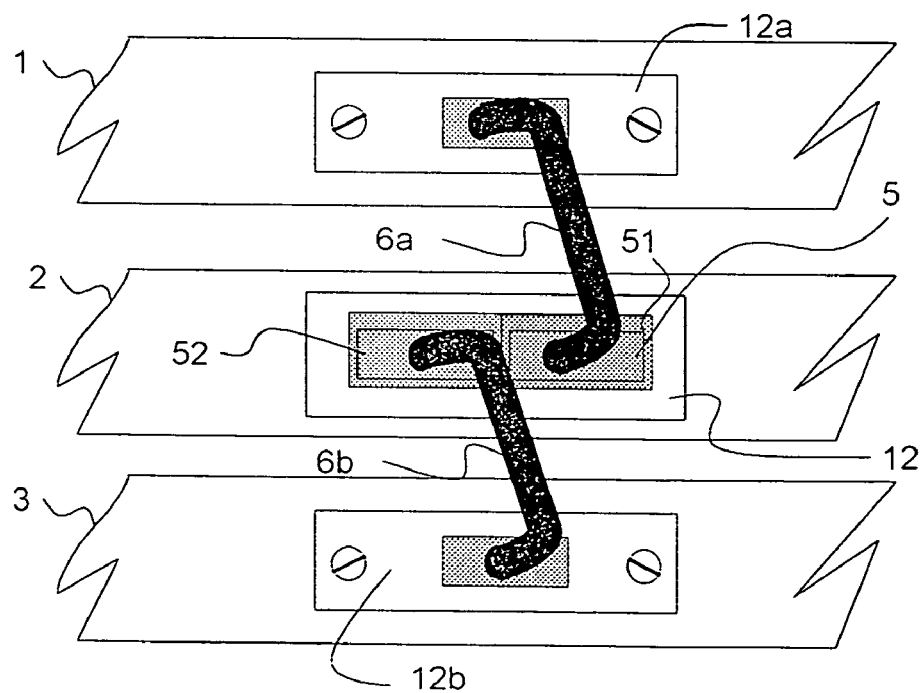
FIG. 3 illustrates the connection of three units in a stack.

Building a stack of three units requires the T-piece 5. This plugs into the cascade port of a cascade module and provides two cascade ports. These ports are also identified as 'up' and 'down'. A stack of three units 1–3 is illustrated in FIG. 3, wherein T-piece 5 is plugged into cascade module 12, its up port 51 is connected by cable 6a to cascade module 12a of the unit above and its down port 52 is connected by cable 6b to cascade module 12b of the unit below.

Cascade Overview

The cascade provides a multiplicity of paths. They are a data path, a control path and a power path (for the T-pieces). The data path may be (if desired) used for both network traffic and in-band unit-to-unit management communications. The control path is used for calculating and transmitting the UnitID values and active unit count values and for controlling the data path.

Cascade Data Path

The data path within the cascade provides a point to point link between each unit in the stack and the next in both the up and down directions. These point to point links, when followed through each unit, form a ring. In the case of a stack of two, which does not require a T-piece, there is simply a path between the transmit and receive ports of the cascade MAC on each unit as illustrated in FIG. 4.

Figure 4:
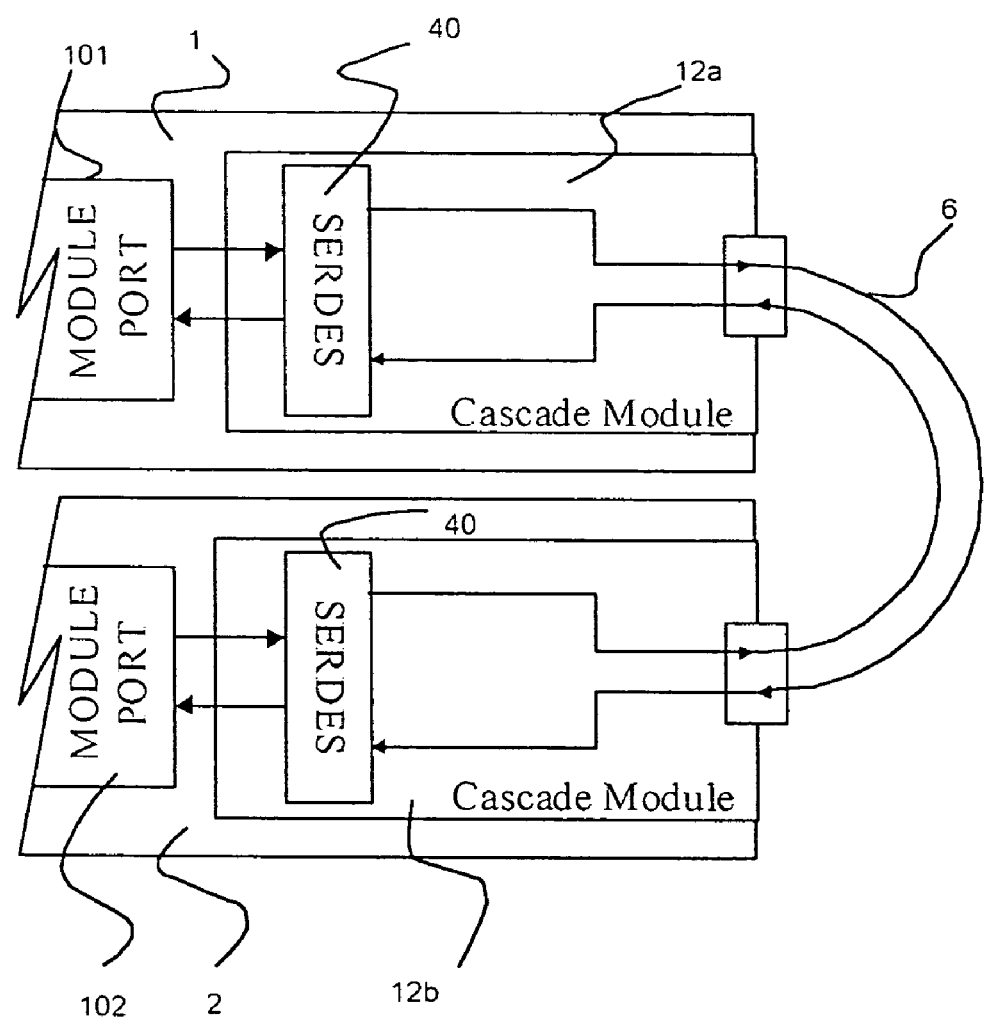
FIG. 4 illustrates a data path between cascade modules in a stack of two units.

Thus in FIG. 4 unit 1 includes a port 101 connected to the cascade module 12a and unit 2 includes a port 102 connected to the cascade module 12b. A data path extends from the transmit section of the port 101 through a serialiser and deserialiser (SERDES) 40 in the cascade module, along cable 6 to cascade module 12b, via a SERDES 40 to the receive section of port 102. The return path extends conversely. Each port comprises a media access controller (MAC) and other logic (in known form) to which the cascade module is connected.

In the case of a stack of three or more, where T-pieces are required, there is again a connection between the ports of each adjacent cascade MAC. In addition the T-piece provides a 'return' data path between the transmit port of the top unit and the receive port of the bottom unit, completing the ring. The T-piece provides multiplexing that enables the bypass of units when they are powered down or removed. The data path in a stack of four is illustrated in FIG. 5.

Figure 5:
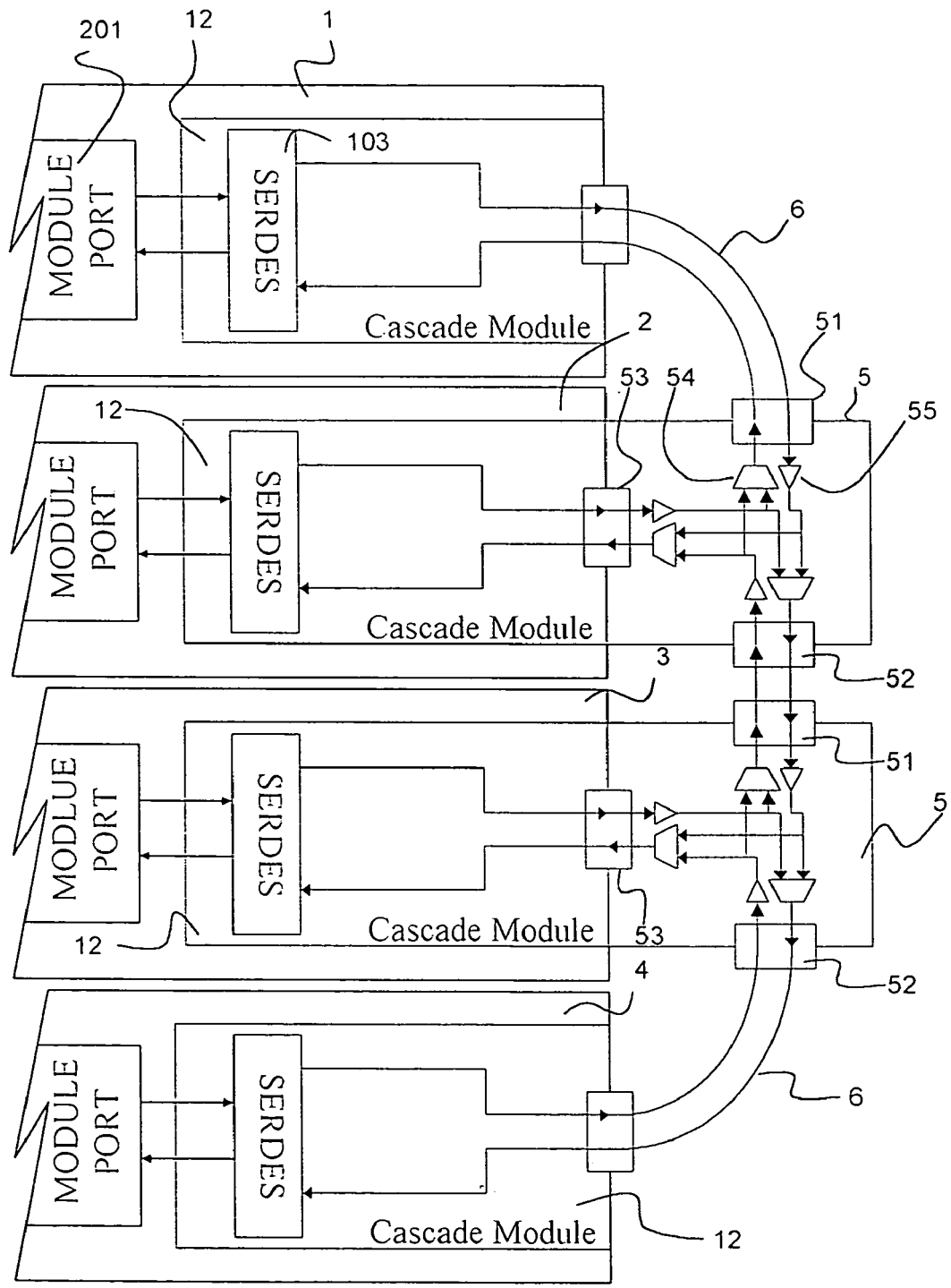
FIG. 5 illustrates data paths between cascade modules in a stack of more than two units.

FIG. 5 illustrates four units 1 to 4 of which the intermediate units 2 and 3 each have a T-piece 5 connected to its cascade module. Each one has and up port 51, a down port 52 and a module port 53 each of which has a multiplexer such as multiplexer 54 on its outward path and a buffer amplifier 55 on its inward path. Each buffer amplifier is connected to the multiplexers on the other two ports. A T-piece will be described in more detail later. Each is organised so that if the associated unit is inoperative, port 53 of the respective T-piece is redundant but there is bidirectional communication between ports 51 and 52 of that T-piece.

Cascade Control Path

The control path within the cascade provides a full-duplex point to point link between each entity, either cascade module or T-piece, in the cascade.

Figure 6:
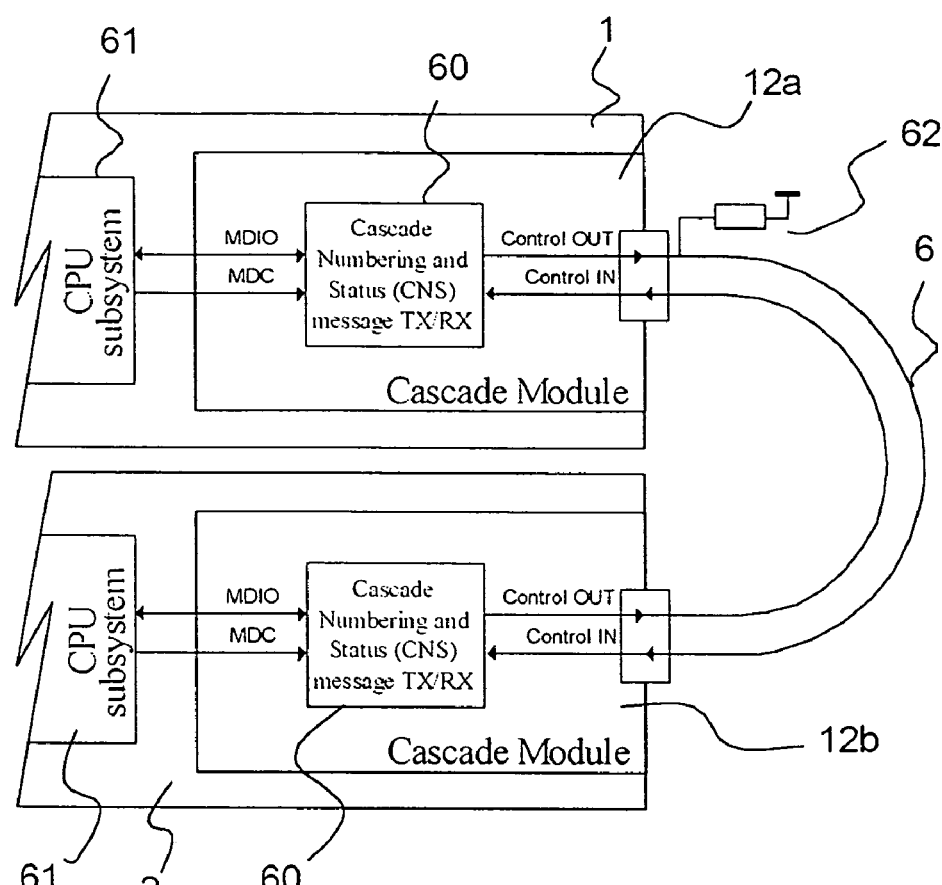
FIG. 6 illustrates control data paths between cascade modules in a stack of two units.

In a stack of two, which does not require a T-piece, there is simply a path between Control IN and Control OUT of the two cascade modules. This is illustrated in FIG. 6, which shows a top unit 1 having a cascade module 12a connected by cable 6 to cascade module 12b in bottom unit 2. Each cascade module has a respective logic block 60, denoted 'Cascade Numbering and Status (CNS) message Tx/Rx', connected by way of MDIO (management data input and output) and MDC (management data clock) lines to a CPU subsystem 61.

In FIG. 6 the cable is shown with a pull-up resistor 62. This will be explained later.

Figure 7:
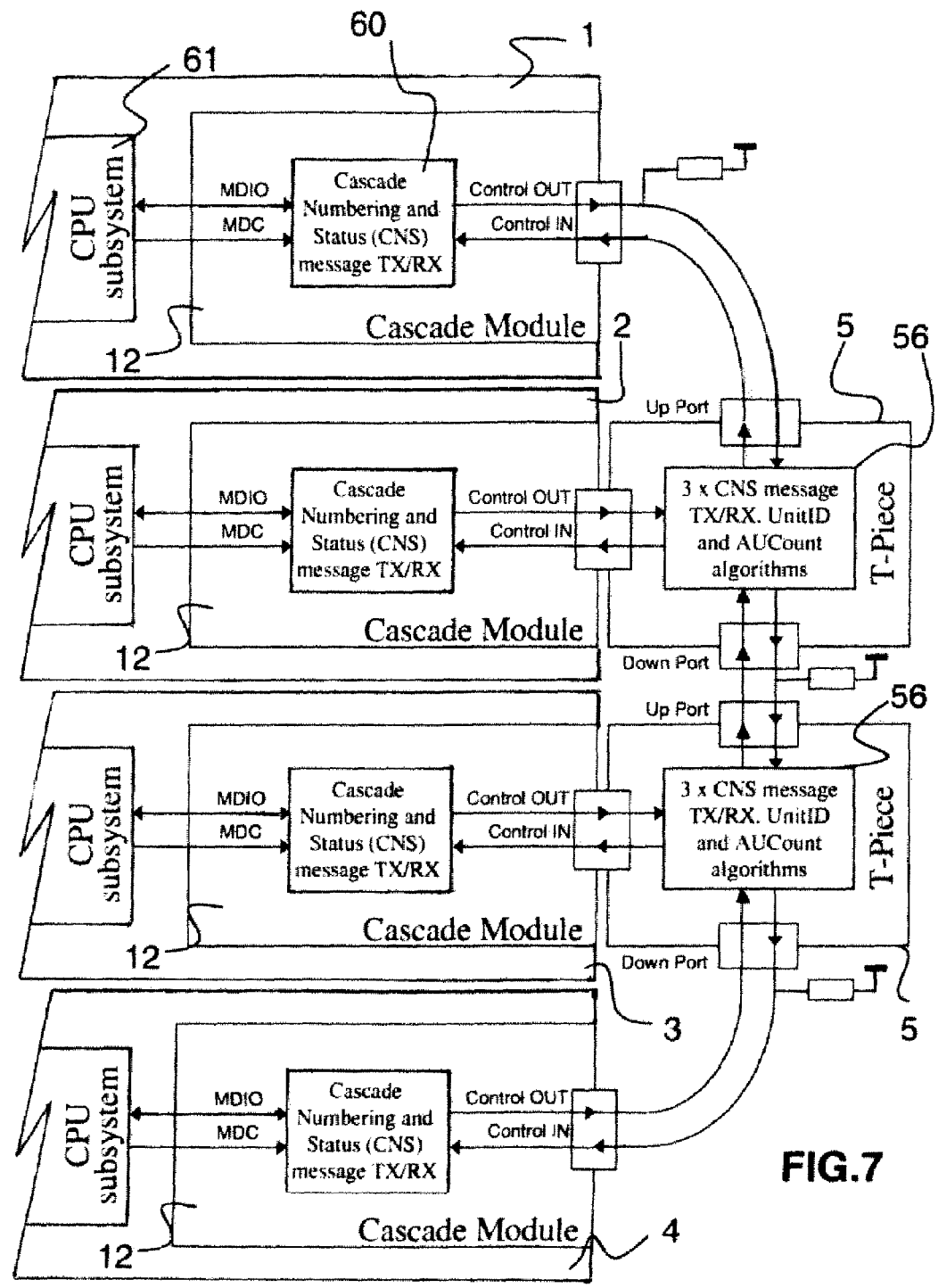
FIG. 7 illustrates control data paths between cascade modules in a stack of more than two units.

In a stack of three or more greater is a path between Control IN and Control OUT of each cascade module and T-piece and between each T-piece and T-piece. This is illustrated in FIG. 7. This shows four units 1 to 4 each with a cascade module 12. The cascade modules for the intermediate units 2 and 3 are each connected to a respective T-piece 5 each of which has a logic unit 56.

The control path is used to enable the UnitID and AUTotal values to be calculated, and then to communicate these values to each unit in the stack. The communication within the control path consists of sending cascade Numbering and Status message (see later). These messages are carried in a serial unidirectional bit stream, the presence or absence of the bit stream is used to derive a 'LinkOK' state at each port. In addition, the idle state of this bit stream, in conjunction with the pull-up resistor fitted to the cable, is used to detect the presence and orientation of a cascade cable.

The cascade module indicates its presence, and provides its configuration, by transmitting Cascade Numbering and Status message (CNS) messages on its Control OUT path. The cascade module receives the current stack information, such as 'AUCount' (the active count), through the CNS messages it receives on its Control IN path.

The T-piece, when present, receives CNS messages on its three Control IN paths. The T-piece then utilises the contents of these messages, including their presence or not, to determine the contents of the CNS messages it then transmits out on it three Control OUT paths.

General Description of a Cascade Module

Figure 8:
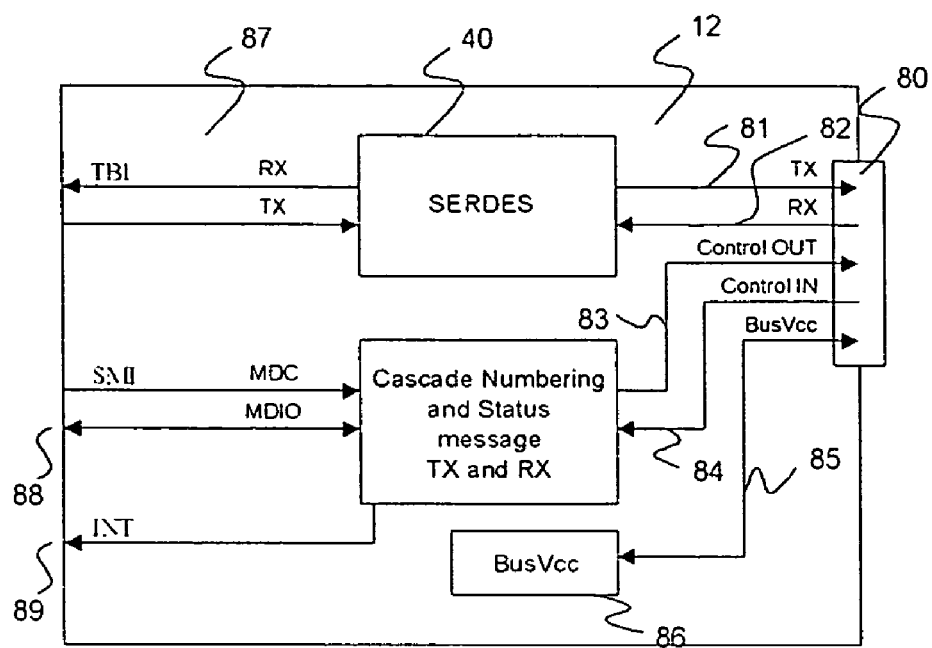
FIG. 8 illustrates a cascade module in more detail.

A cascade module 12 is illustrated in more detail in FIG. 8. This has a cascade port 80 which comprises a multiplicity of lines (of which the data and control lines 81 and 84 may be differential pairs). The lines comprise a data transmit (Tx) line 81, a data receive (Rx) line 82, a Control OUT line 83, and a Control IN line 84. In addition there is a voltage bus line 85. Lines 81 and 82 are connected to the SERDES 40, the lines 83 and 84 to the logic 60 and line 85 to a 'BusVcc' circuit 86.

The cascade provides both 'power down' and 'hot swap' resilience inherently because of the use of the cascade T-piece. When a unit is powered down or removed the physical connection of the cascade is maintained through the T-piece. As this requires active components within the T-piece, power has to be provided through the cascade to the T-pieces. This power is provided on the BusVcc line within the cascade cable. The BusVcc signal is powered by every Unit in the stack and wire-Ored onto the cascade cable.

The cascade module accordingly constitutes an interface between a (communication) unit and a T-piece. Although the modular form is convenient, the interface may be integrated within a communication unit.

Cascade Data Path

The data to/from the module host unit is passed to the module over the downlink connector (not shown) and lines 87. The cascade module runs this connector in Ten Bit Interface (TBI) mode. The SERDES 40 converts the 10-bit wide transmit data into a serial 1 Gb/s stream. On the receive path the SERDES converts the serial stream back to 10 bit data as well as recovering a clock from the data stream.

Cascade Number Status and Control

The Status and Control logic 60 is a set of read/write register locations that allows the CPU of the module host unit to monitor and configure the module. The communication between the host unit's CPU and the module occurs across a Serial Management Interface (SMI) 88 as defined by IEEE 802.3-1998 Clause 22.

Two pieces of identification information need to be provided to each unit in the stack. They are the UnitID, the identification of the unit in the stack numbering from 0 at the bottom, and the AUTotal (the active unit total), the number of active units in the cascade. As previously mentioned the 'unit number' is one more than the respective 'UnitID'.

If the cascade module is connected directly to another cascade module, the stack must be only two high and the AUTotal must be two. The UnitID is then determined by sensing which end of the cascade cable is connected to the module, as stated above it is the cascade cable which determines the Unit numbering in a stack of two. If the cascade module is connected to a T-piece the UnitID and AUTotal is provided by the T-piece to the cascade module.

In addition, to assist with detection of changes, the reported AUTotal is continuously monitored and if a change is detected an interrupt INT can be posted back on line 89 to the host unit's CPU.

Cascade T-Piece Overview

Figure 9:
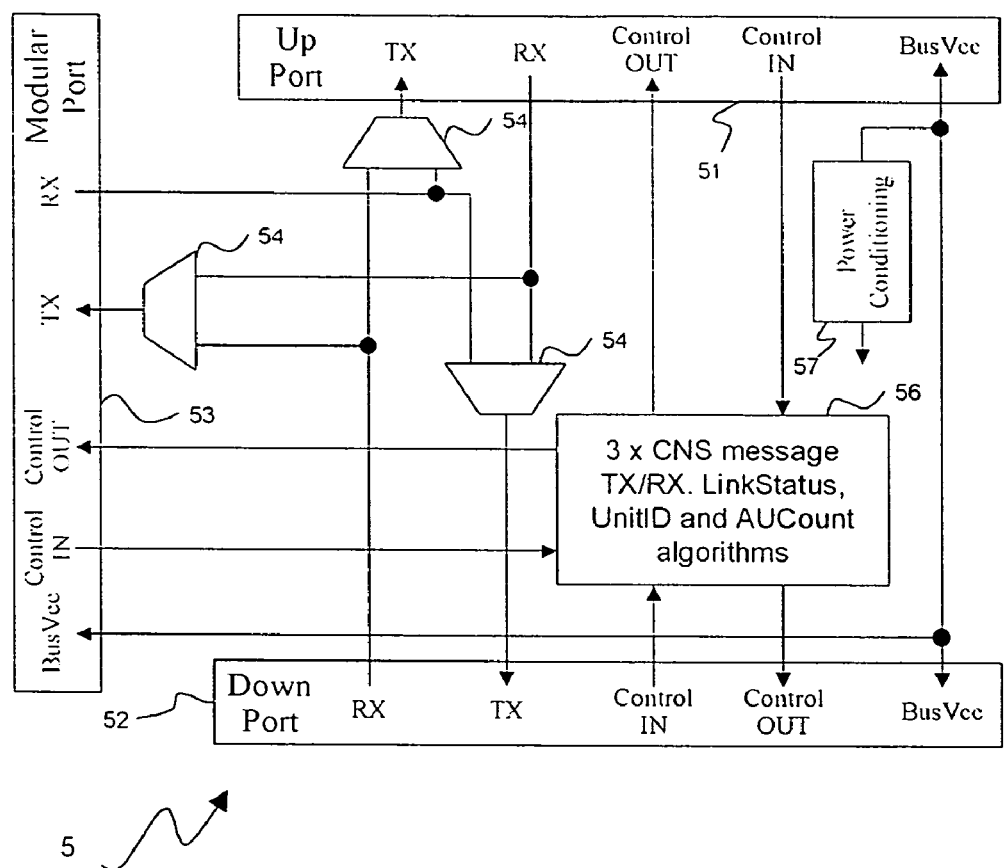
FIG. 9 illustrates schematically a specific embodiment of a 'T-piece'.

A T-piece 5 is shown in more detail in FIG. 9. As previously mentioned it has three ports, an up port 51, a down Port 52 and a modular port 53. The up port connects through a cascade cable to the next T-piece up the stack, or, if the next Unit up in the stack is the Top unit, to that unit's cascade module. Similarly the down port 52 connects through a cascade cable to the next T-piece down the stack, or, if the next Unit down in the stack is the Bottom unit, to that unit's cascade module. Finally, there is the modular port 53. This port connects directly to the cascade module of the Unit with which this T-piece is associated.

Each of the ports provides the same set of signals, Control OUT and IN, Data TX and RX and BusVcc. These signals connect the three main functional blocks, the Link Status and control logic block 56, the data multiplexers 54, and a power conditioning block 57. Each of these is described in the sections below.

Link Status and Control

Two pieces of identification information need to be provided to each unit in the stack. They are the UnitID, the number of the unit in the stack, numbered from Unit 0 at the bottom, and the AUTotal, the number of active units participating in the cascade. This information is derived by the T-piece, from the LinkStatus information on each of its ports and the CNS message received on these ports on the Control IN signal. Once obtained, this information is transmitted by all ports, placed in the appropriate fields of the CNS message, on the Control OUT signal.

LinkStatus

A LinkStatus function is provided for each port on the T-piece. It reports LinkOK by monitoring Control IN for the presence or absence of CNS messages. It also reports the cable orientation by monitoring the idle state of the Control OUT signal. Once in the LinkOK true state this block also extracts some of the fields of the CNS messages including the Active bit (see below) and other bits.

This LinkStatus information is utilised by the T-piece to control the data path multiplexing and calculate the UnitID, AUCount and AUTotal values.

UnitID

Unit numbering is performed by modifying the UnitID field of the CNS message as it is passed up the cascade from the bottom cascade module, across each cascade T-piece. At each cascade T-piece the UnitID field is modified to indicate an increase in UnitID. As the UnitID numbering is performed within the cascade T-piece, which is powered through the BusVcc signal, powering down or removing the Unit associated with the cascade T-piece will have no effect on the UnitID.

AUTotal

The AUTotal is a global value within a cascade that indicates the number of units that are participating in the cascade at any point in time.

Calculating AUTotal

The AUTotal is derived from another field in the CNS message, the AUCount. The AUCount is a value that is incremented as the CNS message is passed up the control path of the cascade. The top T-piece in the cascade then takes the value of AUCount it has calculated and sets AUTotal to equal this value and broadcasts it down the cascade. This T-piece determines that it is the top T-piece by monitoring the control messages as described later.

The AUCount is produced in a similar way to the UnitID, the AUCount being incremented each time it crosses a T-piece on its way up the stack. The one difference is that the if the module 12 associated with a T-piece 5 is powered down or not present, the incrementing of the AUCount value will not take place. This ensures that the AUCount will correctly indicate the number of active units in the stack, the information that is required for correct AUTotal operation.

Broadcasting AUTotal

Once the AUTotal has been derived, it has to be passed to all units for use as their transmitted AUTotal. The only device in the cascade that knows this information is the top T-piece or the single T-piece if there are only three units in the stack. In each case the Up port is connected to a unit; more generally it is not connected to the Down port of a T-piece. Although it would be possible for software to distribute the information however, there would be several practical difficulties, in particular the need to provide a special point to point link protocol. It is preferable to employ the scheme described below.

The 'top' T-piece in the cascade takes the AUTotal it has calculated and sends it back down the cascade within the appropriate field of the CNS message. It also sends this AUTotal from its up and modular ports. The other T-pieces in the stack then take the AUTotal they receive on their up ports and send it on their modular and down ports. Each unit in the stack is therefore aware of how many powered units in the stack and can therefore set their value of AUTotal accordingly. In addition, to assist with detection of changes, the reported AUTotal can be monitored by all cascade modules and if a change is detected an interrupt can be posted.

Data Path Multiplexing

The data path multiplexing is under the control of the LinkOK and Active status of each of the three ports of the T-piece. More details of the multiplexing, and its control, are described later.

Data Path Switching

As was mentioned above it is important that the AUCount used by the various units within the stack is correct. If it is not there is the danger of data corruption. The one time when there is a danger of inaccuracy in the AUTotal is between a unit powering down and being bypassed, and all other Units in the stack knowing about this and changing their AUTotal values.

To minimise the danger when a unit powers down the initial action of the T-piece module, other than changing the AuCount it is issuing, is to interrupt the cascade ring. This ensures that any packets that have been sent, or are about to be sent, with the old AUTotal will be dropped at some point in the ring. After a reasonable time delay the T-piece will then re-make the ring but provide a bypass around the powered-down unit. This delay will be sufficient to allow time for the other Units in the stack to detect that there has been a change and to change the AUTotal they are using.

Although this expedient may cause some packet loss during the interruption of the cascade ring some packet is preferred to data corruption.

BusVcc

The cascade T-piece provides a voltage rail (BusVcc) extending each of its ports. The connection from the module port is a source of power which is distributed out of both the up and down ports. If the unit associated with a T-piece is powered down or removed, power is still supplied to the T-piece through either its up or down port or both these ports. This ensures the data path and UnitID and AUTotal logic continues to operate.

Any power conditioning such as regulation or filtering of the BusVcc rail is provided before it is used elsewhere on the T-piece.

Cascade Numbering and Status (CNS) Message

As described above the cascade provides a data and control path. The data path is used for the network traffic, and, in addition, includes in-band unit to unit management communications. The control path is used for controlling the data path and allocating the UnitID and the AUTotal. The control path within the cascade provides a full-duplex point-to-point link between each entity in the cascade. This provides a bi-directional point to point communications path between each cascade module and T-piece, between each T-piece and the next T-piece and, in the case of a two high stack, between cascade modules.

Communication on the control path consists of sending cascade numbering and status (CNS) messages, preferably constituted by a bit stream similar to that used by an SMI (see IEEE 802.3-1998 Clause 22) to communicate with PHYs. No address field is necessary because communication is over a point to point link in one direction. In addition, no separate clock signal is provided because the clock can be extracted from the messages by the use of a simple clock recovery system as found in UARTs.

The format of a CNS message is shown in FIG. 6. The message consists of a preamble 90, to assist with clock recovery and start of frame detection, and the data frame 91 itself, comprising in this embodiment four bytes (32 bits). The preamble consists of an alternating sequence of '1's and '0's, the bits of the preamble being of half the length of normal data bits, whereby the preamble is a unique sequence not found in the data. The data bits may each be 2 μs long. The line is driven low for 250 ns at the end of the message, after which it is tristated and will remain low or be pulled high by the cable pull-up resistor 62 (as further explained with reference to FIGS. 14–16). The line is tristated for 2 μs after which the message packet is repeated. The sequence of message and the tristate interval is repeated continuously. The fact that a message is being received allows detection of Link Status, the tri-stating of the line between messages allows the detection of the cable presence and orientation. There is no parity or CRC field within the CNS message. Error checking is performed by the receiving device, which treats the data as valid after the same data has been received in three consecutive CNS messages.

Figure 23:
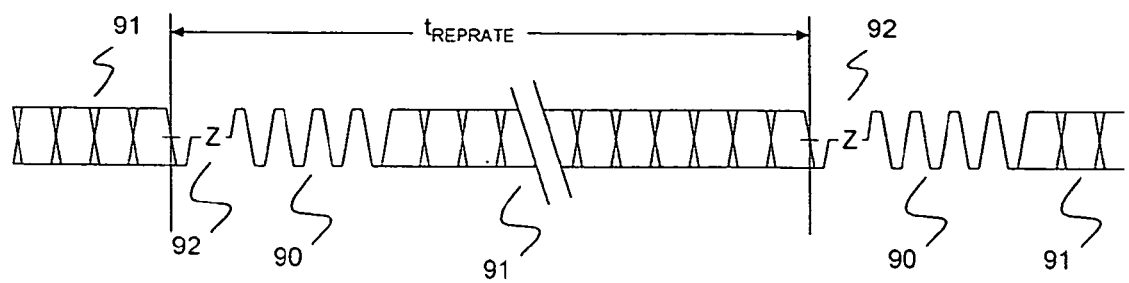
FIG. 23 further illustrates the format of the control message shown in FIG. 10.

FIG. 23 illustrates part of a short sequence of the message packets, showing preambles 90, data frames 91 and tristate intervals 92. The repetition period $t_{REPRATE}$ may be 74.25 μs.

Figures 10, 11:
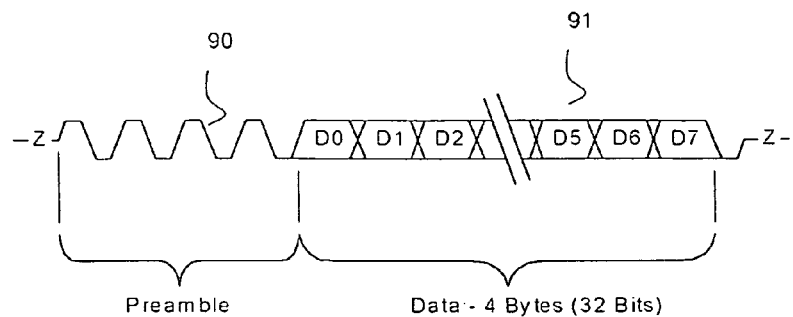
FIG. 10 illustrates part of a control message.
FIG. 11 illustrates a further part of a control message.
Figure 12:
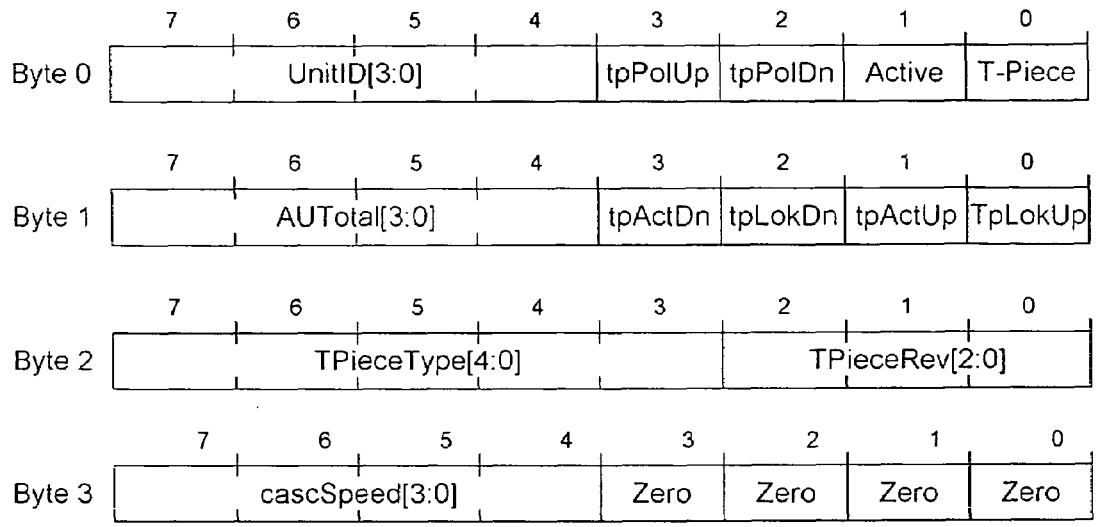
FIG. 12 illustrates a yet further part of a control message.
Figure 13:
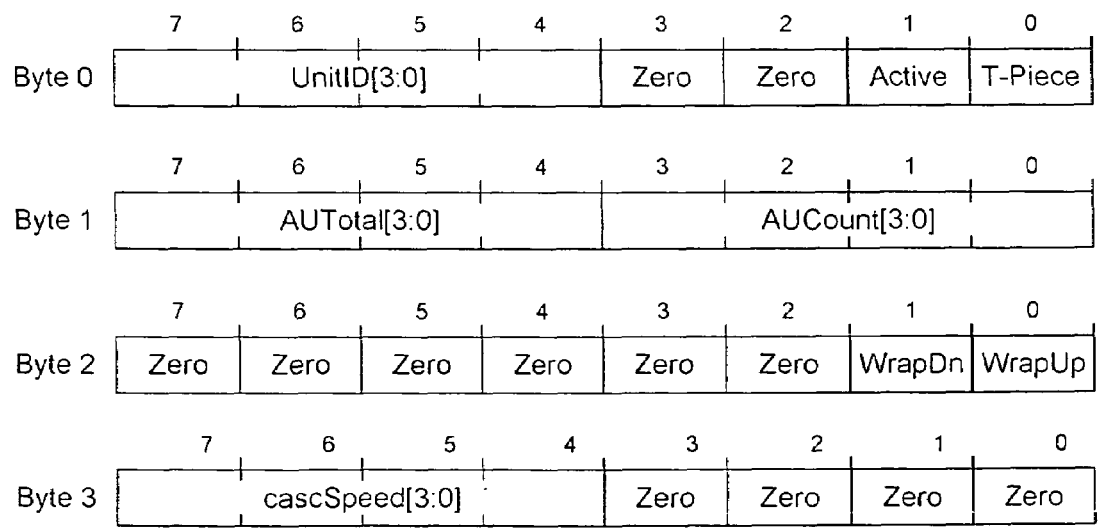
FIG. 13 illustrates a final part of a control message.

FIGS. 11, 12 and 13 illustrate the bit allocation in different circumstances. Some fields are redundant in some circumstances and are therefore be used for another purpose elsewhere.

FIG. 11 illustrates message fields for control messages between T-pieces.

FIG. 12 illustrates message fields for control messages from a T-piece to a cascade module and FIG. 13 illustrates message fields for control messages from a cascade module to a T-piece.

The significance of the various fields is set out in Table 1, below.

| Name | Byte | Bit | Position T-piece to T-piece | Where used T-piece to Cascade Module | Cascade Module to T-piece | Description |
|---|---|---|---|---|---|---|
| UnitID[3:0] | 0 | 7:4 | Yes | Yes | Yes | Unit ID [3:0]: This 4-bit field is used to derive and distribute the Unit Number to each of the Units in the stack. |
| AUTotal[3:0] | 1 | 7:4 | Yes | Yes | Yes | AUTotal [3:0]: This 4-bit field is used to derive the AuCount value. |
| AUCount[3:0] | 1 | 3:0 | Yes | No | Yes | AUCount [3:0]: This 4-bit field is used to distribute the AuCount value derived from the AUTotal mechanism. |
| tpPolup | 0 | 2 | No | Yes | No | T-Piece Polarity up: Reports the orientation of the cable connected to the up port of the T-piece. This bit is intended for Debug only. 0: up Plug connected 1: down Plug connected |
| tpPolDn | 0 | 3 | No | Yes | No | T-Piece Polarity down: Reports the polarity of the cable connected to the down port of the T-piece. This bit is intended for Debug only. 0: up Plug connected 1: down Plug connected |
| Active | 0 | 1 | Yes | Yes | Yes | Active: Used to indicate if a device is active or not and hence if the Data path through is complete or not. 0: Device is Active 1: Device is not active |
| T-piece | 0 | 0 | Yes | Yes | Yes | T-piece: Reports if the device transmitting the message is a T-piece or a cascade module. 1: Transmitting device is a T-piece 0: Transmitting device is a cascade module |
| tpActDn | 1 | 3 | No | Yes | No | T-piece Active down: This bit is a copy of the Active bit received by the T-piece on its down port. This bit is intended for Debug only. |
| tpLokDn | 1 | 2 | No | Yes | No | T-piece LinkOK down: This bit provides the LinkOK |

-continued

| Name | Byte | Bit | Position T-piece to T-piece | Where used T-piece to Cascade Module | Cascade Module to T-piece | Description |
|---|---|---|---|---|---|---|
| | | | | | | status of the T-piece down port. This bit is intended for Debug only.<br>1 LinkOK true<br>0 LinkOK false |
| tpActup | 1 | 1 | No | Yes | No | T-piece Active up: This bit is a copy of the Active bit received by the T-piece on its up port. This bit is intended for Debug only. |
| tpLokup | 1 | 0 | No | Yes | No | T-piece LinkOK up: This bit provides the LinkOK status of the T-piece up port. This bit is intended for Debug only.<br>1 LinkOK true<br>0 LinkOK false |
| TpieceType [4:0] | 2 | 7:3 | No | Yes | No | T-piece Type [4:0]: Indicates the Type of T-piece. |
| TpieceRev [2:0] | 2 | 2:0 | No | Yes | No | T-piece Revision [2:0]: Indicates the Revision of the T-piece attached to its associated cascade Module. |
| WrapDn | 2 | 1 | No | No | Yes | Wrap down: Setting this bit will cause the T-piece that receives it to set the Data path as if the LinkOK was false on its up Port regardless of its actual state.<br>In addition, CNS messages are no longer sent on the up port forcing LinkOK to false on the device below. This bit is intended for Debug only.<br>1 Force Wrap down<br>0 Normal Operation |
| Wrapup | 2 | 0 | No | No | Yes | Wrap up: Setting this bit will cause the T-piece that receives it to set the Data path as if the LinkOK was false on its down Port regardless of its actual state.<br>In addition, CNS messages are no longer sent on the down port forcing LinkOK to false on the device below. This bit is intended for Debug only.<br>1 Force Wrap up<br>0 Normal Operation |
| CascSpeed [3:0] | 3 | 7:3 | Yes | Yes | Yes | Cascade Speed [3:0]: This 4-bit field is used to ensure that, for a stack comprised of devices capable of working at multiple data speeds, there is a common speed at which they can all function.<br>The various speeds are specified by a bit map. Bit 0 indicates the capability to operate at the 1 Gigabit data rate. The speeds of operation specified by the other 3 bits have not yet been defined. A full description of the cascade speed selection mechanism can be found below |

Cascade Speed Selection

The cascade speed selection control is provided in this example to enable proposed future higher speed cascades to provide backwards compatibility with current lower speed cascades.

The cascSpeed[3:0] field is a bit map, each bit corresponding to a possible data rate at which a cascade may operate. Each module sends CNS messages to a T-piece containing a 'cascSpeed' value corresponding to the cascade data rates supported by that unit. This may be a logical AND of the relevant data rates.

Each T-piece (apart from the top one) may logically AND the cascSpeed values received at its down and module port and further AND this with a value representing the cascade speeds supported by that T-Piece. If a module or down port is not present or is not active then a value of 1111 binary may be used as the cascSpeed value for that port. The resultant value is then communicated to the above T-Piece.

The top T-piece in a stack and also AND's the cascSpeed values from the down port, module port and T-piece together as described above. It further AND's this with the cascSpeed value received from its up port. This value represents a bit map of all the speeds which can be supported by all the elements of the stack. It is then sent out of the T-piece's up, module and down ports. All the other T-pieces take this value (which they receive on their up ports) and repeat it to their module and down ports. Thus, this value is effectively broadcast to all the units and T-pieces in the stack.

Each unit reads the overall cascSpeed value. If it is all zeroes then there is no common speed at which all the units and T-pieces in the stack can work and the unit should indicate a misconfiguration. Otherwise, the unit should configure to the highest of the speeds indicated. If the T-piece is capable of operating at multiple speeds then it should also configure to the highest of the indicated speeds.

Stack of Two Data Path

In a stack of two, the data path forms a simple point to point link between the two Units. As there are only two units in the cascade, the AUCount will be set to two. This will mean that packets on the cascade will only pass from one unit to the next effectively providing a 2 Gb/s full duplex cascade.

Stack of Two Numbering

As a stack of two does not have a T-piece, and the modules installed in the two units in the stack are identical, some other approach has to be used to ensure consistent and predictable unit numbering.

One approach in this configuration would be to employ (as is known) a unit's MAC addresses. This approach however presents a number of problems. It is difficult to ensure that a user always has unit one at the bottom and unit two at the top. There may thereby be an inconsistency in the numbering if the stack is ever expanded to a stack of three. To do this a T-piece has to be installed on the middle unit of the stack. A this point the T-piece now controls the Unit numbering and the MAC address no longer has any effect. This would mean that what was Unit 2 would become Unit 1, what was Unit 1 would become Unit 2. The additional unit would correctly be numbered Unit 3. The overall effect of this is that unit re-numbering has taken place when the extra unit was added. While this was caused by the adding of the T-piece, and in some ways could be considered due to the original incorrect configuration of the stack, it is still undesirable and should be avoided.

Another problem with the MAC address number of a stack of two occurs during Power-down and/or Hot Swap. As it is the communication from the other unit, and hence the supply of its MAC address, that maintains the unit numbering, the power-down or removal of the other unit may cause renumbering.

It is therefore an aspect of the invention to control the assignment of unit numbers by means of the cascade cable 6. This can be done by differentiating the two ends of the cable in some way. This differentiation is achieved in this example by fitting one end of the cable with the pull-up resistor 62 within one of the end plugs 63 and 64, in this case the plug 64 at the 'down' end of the cable, which is colour coded, and marked with 'up' and 'down', to assist the correct installation of the cable.

Figure 14:
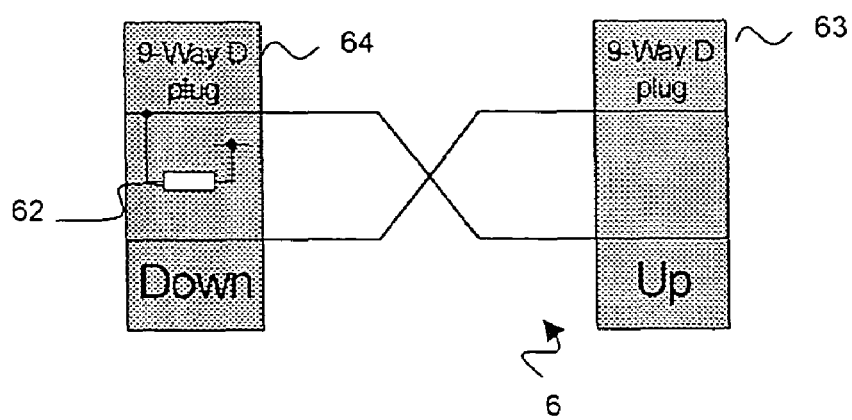
FIG. 14 illustrates a connecting cable.
Figure 15:
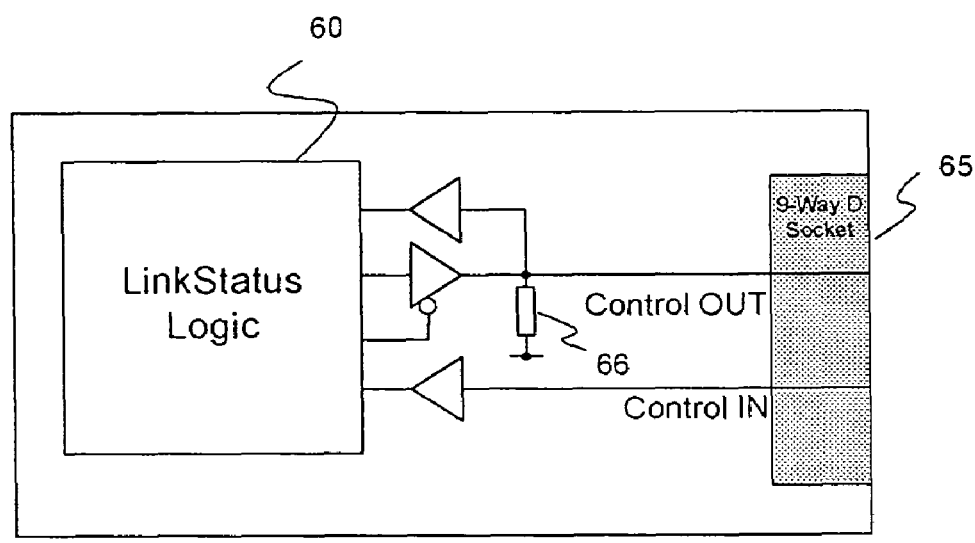
FIG. 15 illustrates logic for sensing the connecting cable.
Figure 16:
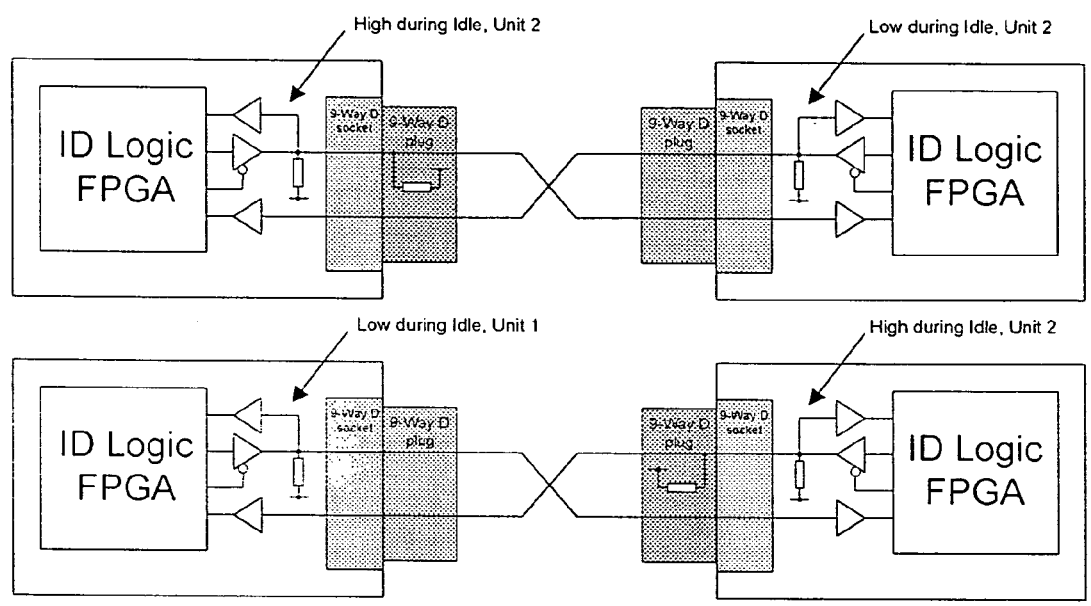
FIG. 16 illustrates the operation of the cable sensing logic.

As is shown in FIGS. 14 to 16, only one end of a cable has a pull-up resistor 62 whereas each module driver has a pull-down resistor 66, of higher value than the pull-up resistor 62. The effect is that the module driver at the end of the cable with no pull-up resistor will go 'low' during the idle period of the CNS message but the module driver at the end of the cable having the pull-up resistor will go 'high' during the idle period of the CNS message, owing to the lower value of the cable's pull-up resistor.

Any cascade device driving the Control OUT signal will drive the signal with a tri-stateable driver in a similar way to the SMI bus. An example circuit for the cascade module is illustrated in FIG. 15. The cascade T-piece will have a very similar circuit on its ports The cascade Status and Control message requires the line to go tri-state after each burst of data. By monitoring if the Control OUT signal goes high or low during the idle period it is possible to detect which end of the cable is connected to a port as is shown in FIG. 16.

With the rule that the user must always connect the cable with the 'up' connector uppermost and the 'down' connector down the units will always number correctly. In addition, this approach also alleviates the problems of adding to the stack, powering down and hot swapping.

Stack of Three or More

Operation

FIGS. 18 to 21, individually discussed below, illustrate the operation of a cascaded stack of four units in respect of (i) the production and transmission of the 'Active' bit which denotes the state of a respective unit; (ii) the computation and storage of the unit identification (e.g. the UnitID) values; (iii) the computation and storage of the active unit count (AUCount); and (iv) the broadcast and storage of the total of active units. As will be seen, various values are stored in registers in the cascade modules whereas the computation (normally incrementing as required) is performed by the T-pieces.

There are three data path multiplexers in a T-piece as shown in FIG. 9. They are controlled by the status reported by the LinkStatus function for each port. The status information used by logic 56 to control the data path multiplexers 54 consists of the LinkOK state and the state of the Active bit contained in the CNS message received when a port is in the LinkOK true state. The Active bit is a facility to force the Data path multiplexing logic to behave as if the port were in the LinkOK false state even though it is not.

Table 2, Table 3 and Table 4 below provide truth tables for control of each of the data path multiplexers.

TABLE 2

Truth table for up Port TX multiplexer data source

| Modular Port Link Status | | up TX multiplexer |
|---|---|---|
| LinkOK | Active | data source |
| false | Don't care | down RX |
| Don't care | false | down RX |
| true | true | Modular RX |

TABLE 3

Truth table for down Port TX multiplexor data source

| Up Port Link Status | | down TX multiplexor |
|---|---|---|
| LinkOK | Active | data source |
| false | Don't Care | Modular RX |
| Don't Care | false | Modular RX |
| true | true | Up RX |

TABLE 4

Truth table for Modular Port TX multiplexor data source

| down Port Link Status | | Mod TX multiplexor |
|---|---|---|
| LinkOK | Active | data source |
| false | Don't Care | Up RX |
| Don't Care | false | Up RX |
| true | true | down RX |

When a port is bypassed due to its associated LinkOK or Active bit being false, as defined above, data may still be transmitted to that port. Data however is no longer supplied from this port hence continued operation of the stack.

Active Bit

As described above the Active bit is a facility to force the data path multiplexing logic to behave as if the port were in the LinkOK false state even though it is not. This facility is used for two purposes.

The first use is to allow software on a unit to override, via its cascade module, the LinkOK status of a connected T-piece port. This is achieved by software instructing the cascade module to set the Active bit false in the CNS messages it is sending. This will cause any attached T-piece to put the associated data path into bypass. This enables a unit to be attached to the cascade while not participating in the data path.

Figure 17:
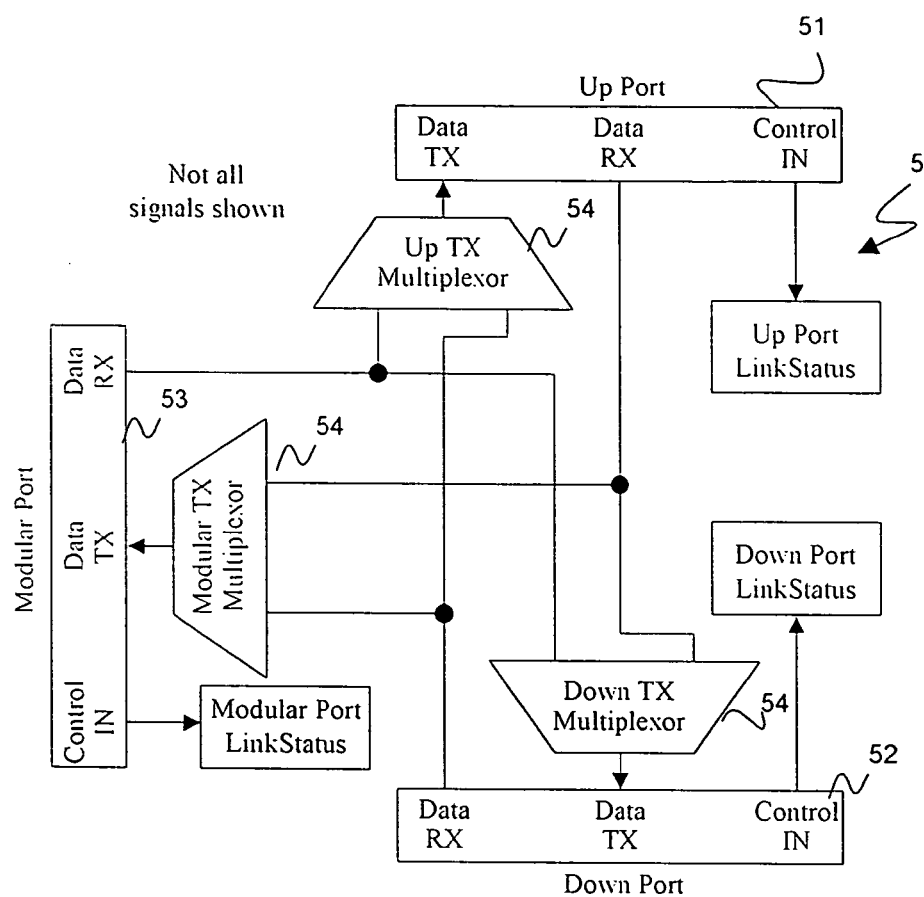
FIG. 17 is a simplified illustration of a connecting T-piece.

The second use of the Active bit is to allow a T-piece to signal that it can no longer participate in the data path. As can be seen in FIG. 17, a data path is not provided between the RX and TX lines of the up port nor between the RX and TX lines of the down port. This means, for example, if the uppermost T-piece of a stack is connected to a powered down unit on both its modular port and its up port there is no way to maintain the data path loop within the cascade. Instead, in this situation, the top T-piece, still powered via BusVcc, sets the Active bit to false in the CNS message it is transmitting from its down port. The next T-piece down the stack, seeing the 'Active' bit set to false, will loop round the data, re-forming the cascade loop. It should be noted that it is only the data path function that is passed down to the lower T-piece in this situation, the remaining functions, such as AUTotal calculation, continues to be performed by the top T-piece.

If, in a large stack, multiple units towards the top of the stack are powered down, the setting of the Active bit to false will propagate down the stack through several T-pieces. In this situation, a T-piece lower down the stack will actually be doing the data loop back. This is also true for the lowermost T-pieces within a stack. The only difference in this case is that it will be the Active bit contained in the CNS message that is being transmitted out of the up ports, that will set to false.

A cascade module ignores the Active bit within the CNS messages it is receiving. This can be done as the reception of a Active bit set false by a cascade module, for either reason described above, indicates there is no other unit in the stack that is capable of participating in the data cascade. Once in this state there is nothing the remaining active cascade module can do.

Figure 18:
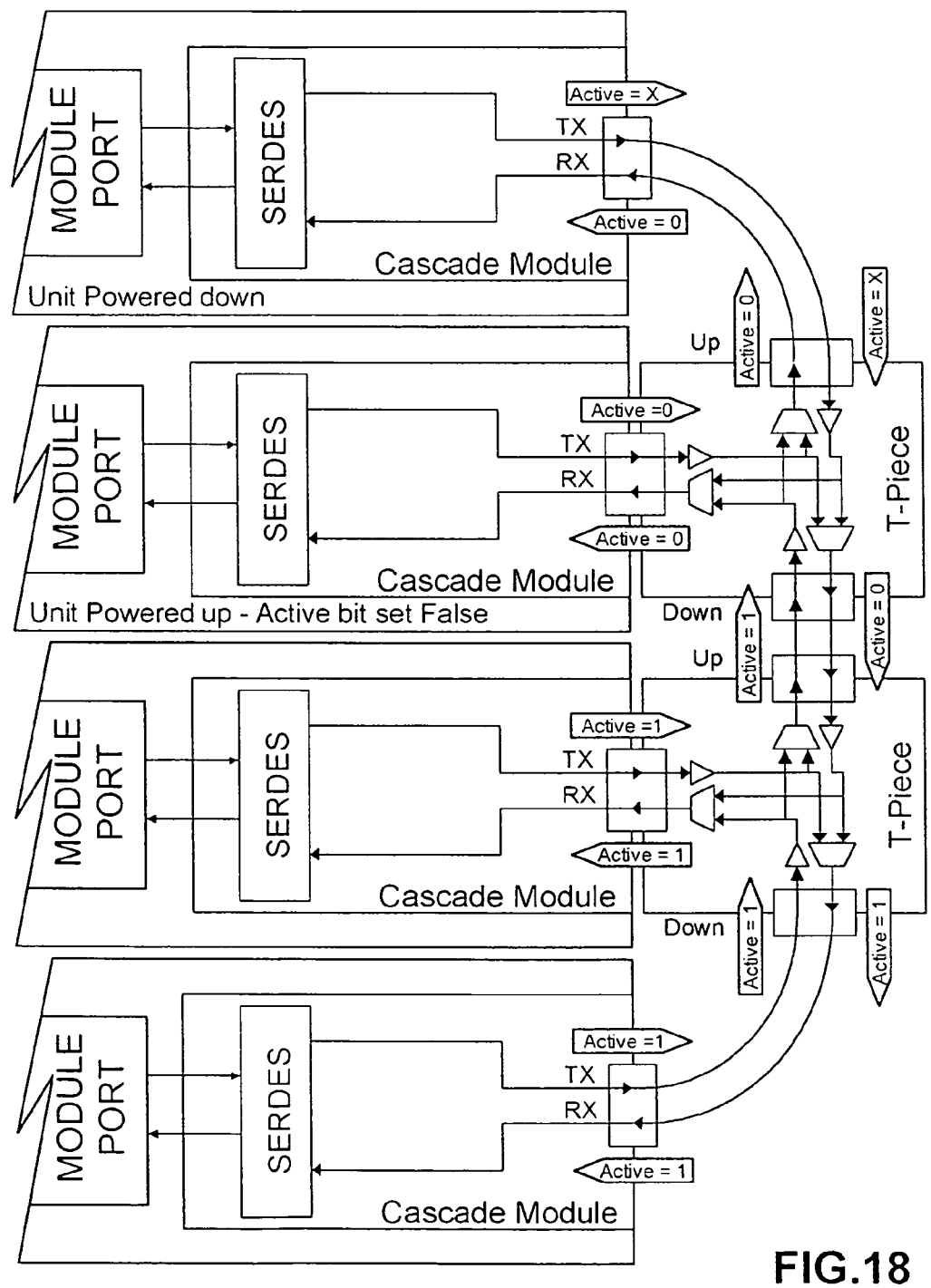
FIG. 18 illustrates part of the operation of a four-unit stack.

More particularly FIG. 18 illustrates by means of the directed boxes denoted 'Active=0' and 'Active=x' the value of the active bit indicated within the control IN and control OUT messages. 'x' indicates 'unknown' because the unit that should be sending the message is powered off or otherwise inactive.

FIG. 18 illustrates the two uses of the Active bit. The top unit in the stack is power-down hence the LinkOK state for the top T-piece up port is false (0). The next Unit down, connected to the T-piece modular port, is powered-up but sending the Active bit set false. This means that both the up and modular ports have to be bypassed but as described above this is not possible so the Active bit is set false in the CNS message transmitted by the T-piece on its down port.

Table 5 and Table 6 below provide the logic for generating the Active bit sent within the up and down CNS message.

It would be possible to avoid the need for the Active state to be monitored on up and down ports if additional data paths were provided within the T-piece. An additional two paths would have to be provided within the T-piece that were able, when required, to connect the down TX line to the down RX line and the up TX line to the up RX line.

TABLE 5

T-Piece Truth table for Active State sent on down port

| Up Port Link Status | | Modular Port Status | | Active bit transmitted |
|---|---|---|---|---|
| LinkOK | Active | LinkOK | Active | on down port |
| false | don't care | false | don't care | false |
| false | don't care | don't care | false | false |
| don't care | false | false | don't care | false |
| don't Care | false | don't care | false | false |
| true | true | don't care | don't care | true |
| don't care | don't care | true | true | true |

TABLE 6

T-Piece Truth table for Active State sent on up port

| Down Port Link Status | | Modular Port Status | | Active bit transmitted |
|---|---|---|---|---|
| LinkOK | Active | LinkOK | Active | on up port |
| false | don't care | false | don't care | false |
| false | don't care | don't care | false | false |
| don't care | false | false | don't care | false |
| don't care | false | don't care | false | false |
| true | true | don't care | don't care | true |
| don't care | don't care | true | true | true |

Unit ID Allocation

The UnitID allocation is performed by the T-pieces which utilise the information contained in the CNS messages. As CNS messages are passes up the stack from T-piece to T-piece the UnitID carried by the message is sent to the modular port as modified and then sent up out of the up port as shown below.

Figure 19:
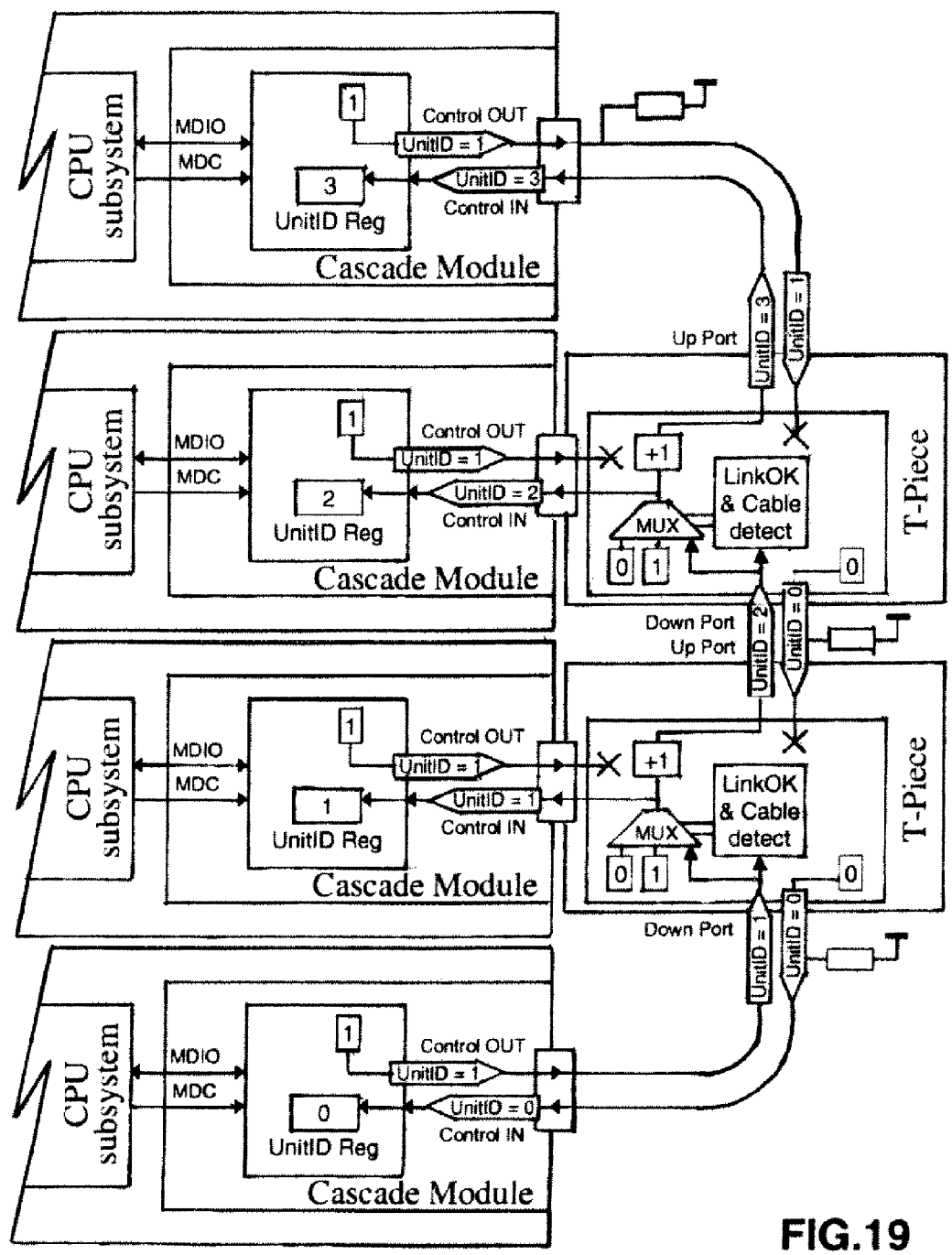
FIG. 19 illustrates various Unit ID fields in various part of the four-unit stack.
Figure 20:
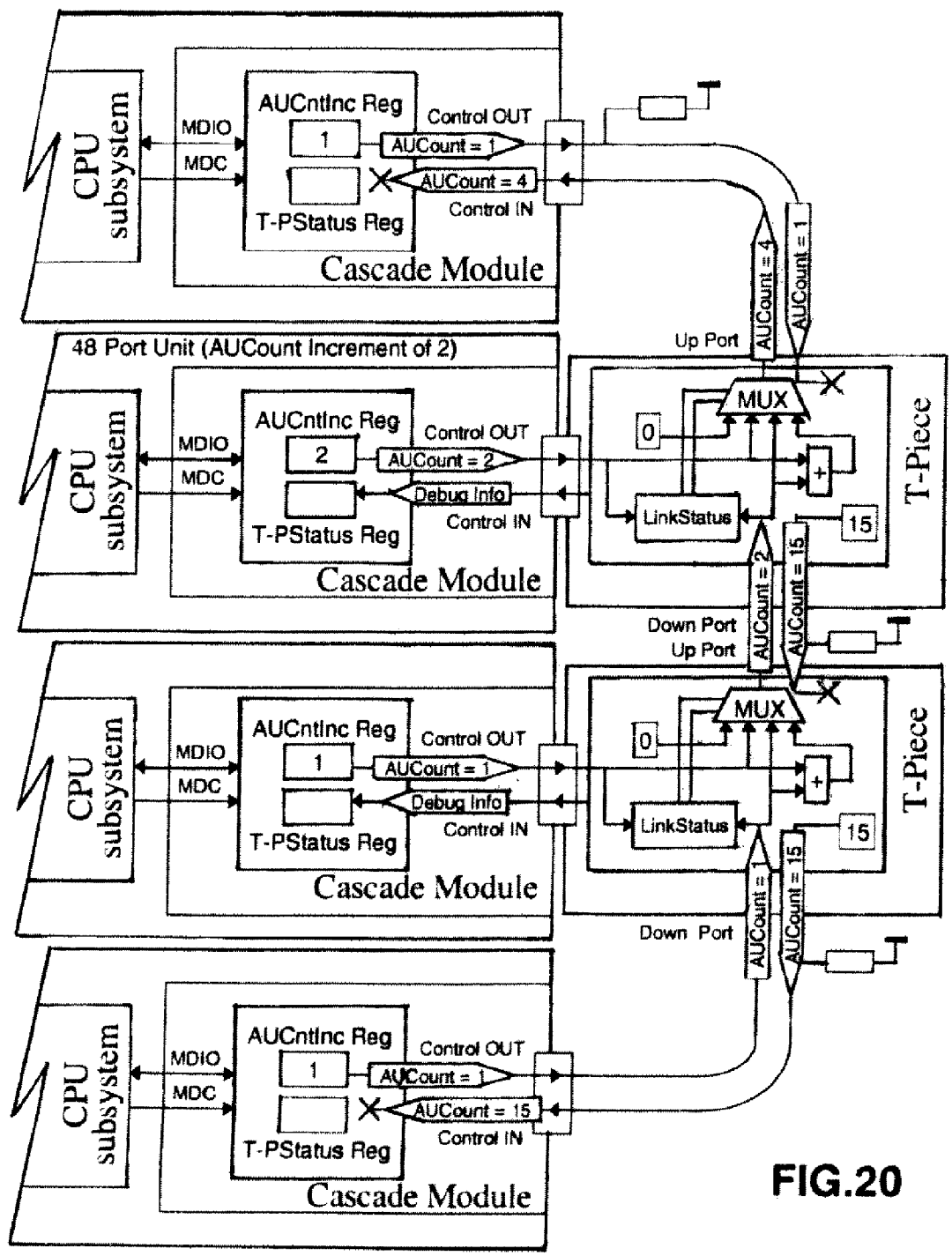
FIG. 20 further illustrates 'active unit count' message fields in the various parts of the four-unit stack.

FIG. 19 illustrates the value of the 'UnitID' conveyed by the respective control messages in and out of each cascade module and each T-piece. Each cascade module has a storage means, denoted 'ID Reg' which stores the value of UnitID, and a means of providing a UnitID=1 value in the control OUT signal. This is effectively ignored when received at a modular port of a T-piece. Each T-piece passes by way of its modular port the UnitID value received at its down port, and passes an incremented value of the UnitID to its up port.

A cascade module will always transmit a UnitID value of 1 in the UnitID field of the CNS messages.

A T-piece will always transmit a UnitID value of 0 in the UnitID field of the CNS messages transmitted on the down port. This is required to ensure detection of the incorrect connection of a T-piece up port to another T-piece up port and also to ensure that the bottom unit correctly receives a UnitID value of 0.

A T-piece will always transmit the UnitID value as defined in Table 7 in the UnitID field of the CNS messages transmitted on the modular and up port.

TABLE 7

Truth table for modular and up port UnitID field values

| Down port Link Status | | Modular port Unit ID field value | Up port UnitID field value |
|---|---|---|---|
| LinkOK | Cable Present | | |
| false | false | 0 | 1 |
| false | true | 1 | 2 |
| true | false | down RX UnitID | down RX UnitID + 1 |
| true | true | down RX UnitID | down RX UnitID + 1 |

In Table 7, the 'Cable Present' value is based on the assumption that when Cable Present is reported as false no cable is present. Cable Present will however also be reported false when the cable is incorrectly connected, that is if the Cable up connector is plugged into the T-piece down Port or if the Cable down connector is plugged into the up Port.

It is not strictly necessary to distinguish between the first two lines of the third and fourth columns of Table 7. What it does provide is that if a stack is configured incorrectly with a T-piece on every unit the stack will still number correctly from a UnitID of 0.

The state of the Active bit of the CNS message received on the Down port is a 'don't care' in all UnitID calculations.

If the result of any addition exceeds the value of 15, the result will be set to 15.

One example of the UnitID message fields for a stack of four units is shown in FIG. 19.

AUCount and AUTotal

The AUTotal is a piece of information required for the correct operation of the stack. This value is derived by calculating the AUCount on the way up the stack then broadcasting the total as the AUTotal back down the stack. The operation of the AUCount and AUTotal allocation is described below.

AUCount Allocation

The AUCount value is an internal value used to derive the AUTotal, the value that is actually communicated to, and used by, the attached units.

The AUCount calculation is performed by the T-pieces utilising the information contained in CNS messages. As the AUCount information is passed up the stack, within CNS messages, it is incremented as required, dependent upon the LinkStatus information, and the received AUCount field, of the modular and down T-piece ports.

It is possible that some units in the cascade will require a AUCount allocation of two. An example of this would be a 24 port unit that is implemented using two 12 port devices and that uses the cascade internally, within the unit, to connect these two devices. To provide for this situation the AUCount field on a modular port is examined. This value is then added to the AUCount field value received on the T-piece down port to determine the value sent on the T-piece up port.

As noted above the AUCount is internal to the cascade and therefore is not communicated to the attached modules. Instead the bits used for the AUCount are substituted with status information in the case of T-piece to cascade module CNS messages.

The actual calculation of the AUCount is defined below.

A module transmits a AUCount value of either 1 or 2 in the AUCount field of the CNS message dependent on the number of hops the particular unit requires.

A T-piece transmits a AUCount value of 15 in the AUCount field of the CNS messages transmitted on down ports. This is required to ensure that an incorrectly configured stack will set its AUTotal to 15.

A T-piece transmits the AUCount value as defined in Table 8 in the AUCount field of the CNS messages transmitted on the up port.

Table 8 shows a truth table for up port AUCount field values.

TABLE 8

Truth table for up Port AUCount field values

| Down Port LinkStatus | | Modular Port LinkStatus | | Up Port TX AUCount value |
|---|---|---|---|---|
| LinkOK | Active | LinkOK | Active | |
| false | don't care | false | don't care | 0 |
| false | don't care | don't care | false | 0 |
| don't care | false | false | don't care | 0 |
| Don't care | false | don't care | false | 0 |
| false | don't care | true | true | Modular RX AUCount |
| don't care | false | true | true | Modular RX AUCount |
| true | true | false | don't care | down RX AUCount |
| true | true | don't care | false | down RX AUCount |
| true | true | true | true | Modular RX AUCount + down RX AUCount |

As the AUCount is only related to powered up and active units, it does not take any account of the cable orientation of the down port. If the result of any addition exceeds the value of 15, the result will be set to 15.

AUTotal Allocation

The basic function of the AUTotal logic is to detect if the T-piece is at the top of the stack and, if it is, to calculate and then broadcast the AUTotal to all other units in the stack. If the T-piece is not at the top of the stack it instead simply relays the AUTotal it is receiving to its down and modular ports.

In summary, this is accomplished by monitoring the LinkOK State of the up port. If the Port is in the LinkOK False state, or is in the Link OK true state with a cascade module connected, the T-piece must be at the top of the stack. If this is the case the logic then calculates the AUTotal value by adding the AUCount that has been derived to be sent out of the up port to the AUCount being received on the up port. It then broadcasts this value out of all ports in the AUTotal field of all ports.

Alternatively, if the up port is in the LinkOK true state with a T-piece connected, the T-piece must be in the middle of the stack. In this case the T-piece simply takes the AUTotal received on the up port and then transmits this value in the AUTotal field of its down and modular ports. In addition, the T-piece transmits a value of 15 in the AUTotal field of its up port. This is done to ensure detection of stack configuration errors.

The actual calculation of the AUTotal is defined below.

A module transmits a AUTotal value of 1 in the AUTotal field of the CNS message.

A T-piece will always transmit the AUTotal value as defined in Table 9 in the AUTotal field of the CNS messages transmitted on the up, down and modular ports.

TABLE 9

Truth table for up, down and modular port AUTotal field values

| Up Port LinkStatus | | Down and Modular Port | Up Port TX AU- |
|---|---|---|---|
| LinkOK | Connection | TX AUTotal field value | Total field value |
| false | Don't Care | up TX AUCount | up TX AUCount + |
| true | Module | up TX AUCount + up RX AUCount | up TX AUCount up RX AUCount |
| true | T-piece | up RX AUTotal | 15 |

A T-piece transmits a AUTotal value of 15 in the AUTotal field of the CNS messages transmitted on up ports when the up port is connected to a T-piece. This is required to ensure that an incorrectly configured stack will set its AUTotal to 15.

If the result of any addition exceeds the value of 15, the result will be set to 15.

Figure 21:
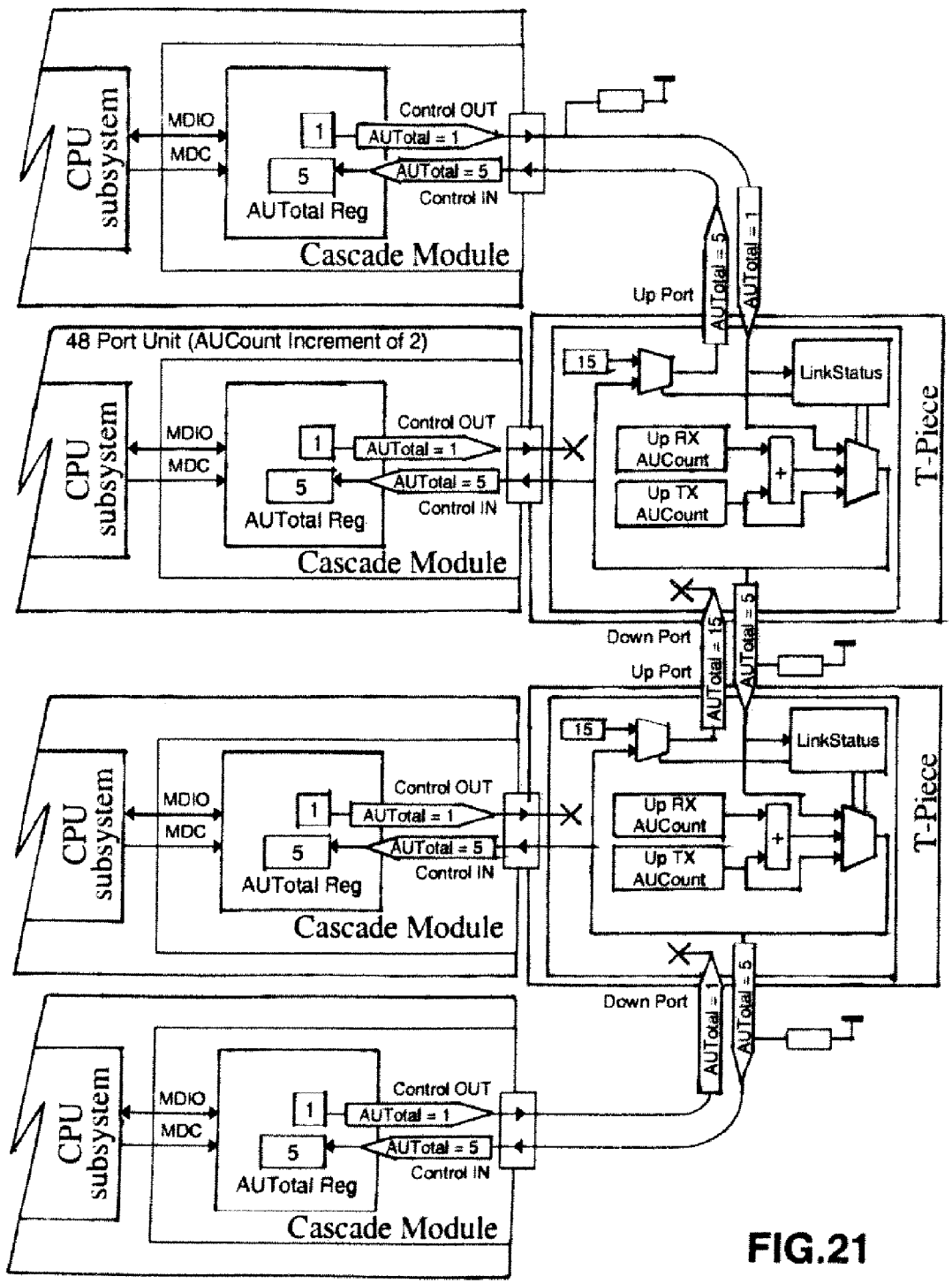
FIG. 21 further illustrates 'active unit total' message fields in the various parts of the four-unit stack.

As an example, the allocation of the AUTotal within a stack of four is illustrated in FIG. 21.

FIG. 21 illustrates the 'AUTotal' register in each cascade module, set according to the AUTotal value in the respective control IN message, a means (such as a single bit register set to '1') for setting the 'AUTotal' of a cascade modules control OUT signal to '1'.

Cascade Cable—Incorrect Configurations

There are a few possible cases of the user incorrectly configuring a stack. In a stack of two there is only one case, that is when a cable in connected between the two units upside-down. In a stack of three or greater there are four possible cases. A up port connected to a up port, a down port connected to a down port, the stack connected upside-down and finally a cable between the top T-piece up port to the bottom T-piece down port. All other cases are a combination of the above.

Stack of Two—Incorrect Configurations

In this case, the units will be numbered in reverse order with Unit Number 2 (UnitID=1) at the bottom and Unit Number 1 (UnitID=0) at the top. This will be visible to the user from the unit number LEDs and they can correct the orientation of the cable if they wish. The stack however will operate correctly in this configuration.

Stack of Three or More—Greater Incorrect Configurations

Figure 22:
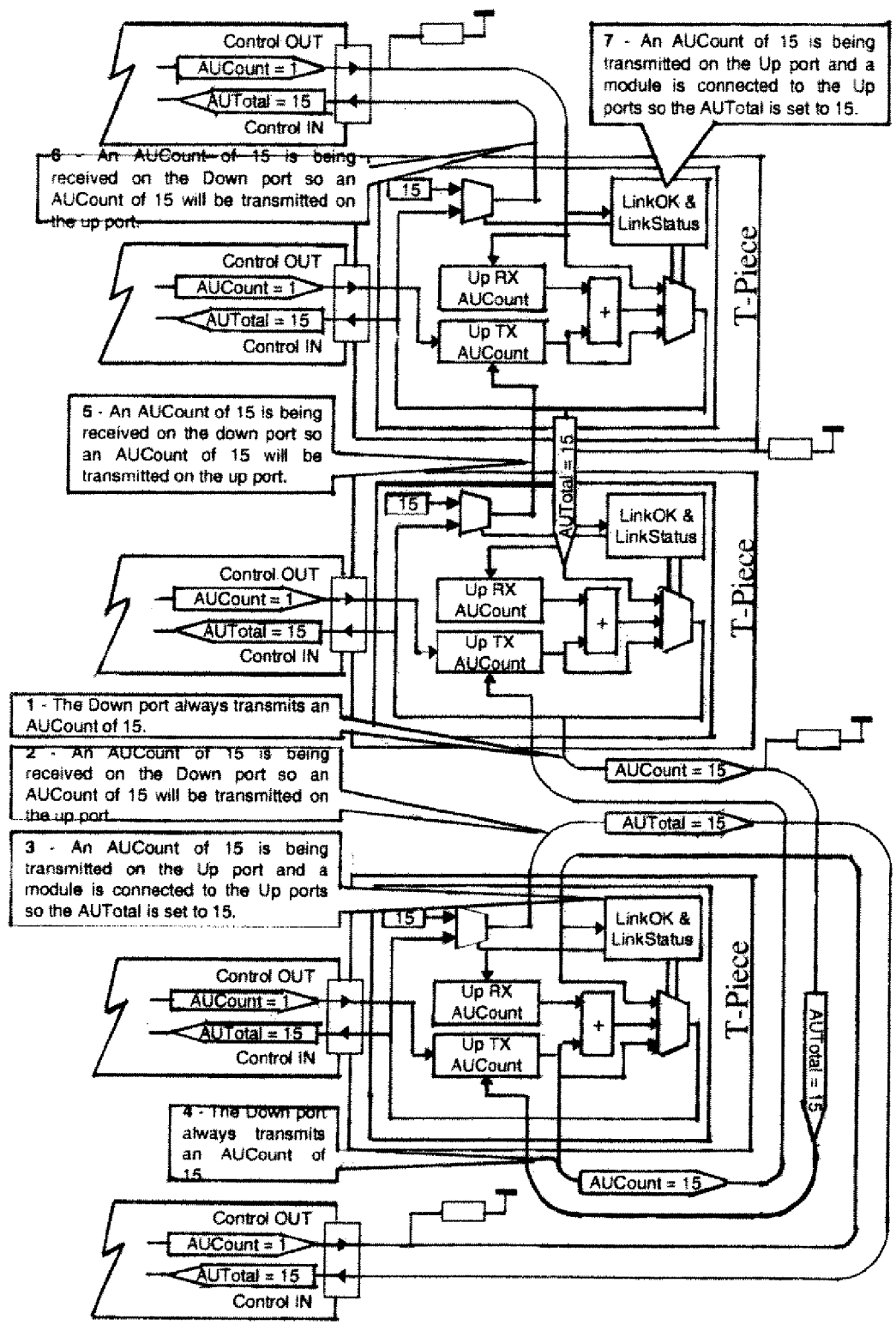
FIG. 22 illustrates various control data in a wrongly configured stack.

There are four possible configuration errors in this case. Each of these is examined below, and an example of one case, a down port connection to a down port, is illustrated in FIG. 22.

In three of the cases, down port to down port, up port to up port and top T-piece top port to bottom T-piece down port, the configuration error is such that the stack cannot operate. This is indicated to the cascade modules by setting the AUTotal or UnitID value they are sent to 15. If the agent software operating on the units detects the AUTotal or UnitID set to 15, it in turn indicates the error to the user by setting the module LED into its error indication.

Up Port to Up Port Connection

In the case of a up port to up port connection there will be no spare up port to connect to the highest module in the stack. In this case either there is a down port to down port connection elsewhere in the stack or the cascade module at the top connects to an down port.

In the case of the actual up port to up port connection it should be noted that the AUTotal logic will transmit 15 in the AUTotal field in both directions. This is because both up ports have a connection to a T-piece. This will ensure all units will receive a AUCount of 15 throughout the stack.

Down Port to Down Port Connection

In the case of a down port to down port connection there would be no spare down port to connect to the lowest module in the stack to. In this case either there is an up port to up port connection (see above) elsewhere in the stack or the cascade module at the bottom connects to an up port.

In the case of the actual down port to down port connection it should be remembered that the AUCount transmitted on a T-piece down port is always 15. This means that the AUCount that will now propagate up the stack, from the location of the down port to down port connection, will be 15. Once this reaches the Top T-piece, the value will then be broadcast to all other units as the AUTotal.

Top T-piece to Top Port to Bottom T-piece Down Port

In this case, a loop is formed in the control path. This will cause the UnitID to continuously increment as it crosses each T-piece. There is however, the rule that once the UnitID reaches 15, the result of any addition is 15. This will limit the continuous incrementing of UnitID and all T-pieces will eventually have a UnitID of 15, which they pass to the attached cascade modules.

Incorrect Cable Orientation Connection

In this case, all units will number correctly, however Unit 1 will be at the top of the stack and the highest numbered unit will be at the bottom. This will be visible to the user from the unit number LEDs; the stack however will operate correctly in this configuration.

The invention claimed is:

1. A method of controlling a plurality of network communication units which are linked by a cascade connection that provides a communication path for data packets from any unit to any other unit, comprising:
   (i) establishing a control path for point-to-point control messages from each unit to the next, the control path being distinct from said communication path;
   (ii) sending only along said control path said point-to-point control messages which include fields denoting an identification of a communication unit and a count of communication units which are operative to receive and forward data packets only on said communication path; and
   (iii) for each respective unit;
     (a) altering the identification to denote the respective unit; and
     (b) incrementing the said count if the respective unit is operative to receive and forward data packets on said communication path.

2. A method according to claim 1 and further comprising determining when said count is complete and broadcasting a total of said count by way of point-to-point control messages on said control path.

3. A connecting unit for use in a system comprising a plurality of network communication units having a cascade connection including said connecting unit, the connecting unit having three external ports consisting of a first, second and third port, each port of the connecting unit being configured to couple to one of said network communication units and to forward and receive data packets, the connecting unit including multiplexers which provide a data path for packets from each of the said ports to either of the others and which bypass the data path of a port to which an active communication unit is not coupled based upon point-topoint control messages on a control path provided from each of the said ports to either of the others and separate from said data path.

4. A connecting unit according to claim 3 wherein each port has control lines separate from said data path for transmitting and receiving said point-to-point control messages so as to determine the status of a communication unit to which the respective port is connected, the multiplexers being controlled by control logic responsive to said control messages.

5. A connecting unit according to claim 3 and disposed to increment a signal value representing identification numbering in accordance with the number of communication units to which the connecting unit is coupled and to increment a signal value representing an active unit count in accordance with signals indicating an operational state of each communication unit to which the connecting unit is coupled and to effect by way of the control messages the communication of said signal values from at least the second port.

6. A connecting unit for use in a system comprising a plurality of network communication units having a cascade connection including said connecting unit, the connecting unit having three external ports consisting of a first, second and third port, each port of the connecting unit having first lines for forwarding and receiving data packets and second lines, separate from said first lines, for forwarding and receiving point-to-point control messages from each of the said ports to either of the others and including control logic under the control of the control messages; the connecting unit providing a data path for packets from the first port to the third port and from the third port to the second and also from the second port to the first, the connecting unit forwarding to the third port packets received at the first port when said control logic indicates that an active communication unit is coupled to the third port and by-passing the third port when said control logic indicates that an active communication unit is not coupled to the third port.

7. A connecting unit according to claim 6 wherein the connecting unit includes multiplexers each of which is controllable by the control logic to direct packets received at a respective port to either one of the other two ports and to cause bypass of a port to which an active communication unit is not connected.

8. A connecting unit according to claim 7 wherein the control logic receives by way of the first port control messages indicating an identification number and provides from the second port control messages modified to indicate an increase in the identification number.

9. A connecting unit according to claim 6 wherein the control logic receives by way of the first port a count which represent a number of active communication units and provides from the second port a count which is incremented only if an active communication unit is coupled to the third port.

10. A system comprising at least three network communication units each of which has a cascade port and a multiplicity of other ports for the reception and forwarding of addressed data packets, and at least one connecting unit, each such connecting unit having a first external port, a second external port and a third external port each having first lines for forwarding and receiving data packets from each of the said ports to either of the others and second lines, separate from said first lines, for forwarding and receiving distinctive point-to-point control messages from each of the said ports to either of the others, wherein each communication unit is coupled by way of its cascade port to a respective external port of a connecting unit, whereby to form a ring connection constituted by a point-to-point communication link between each communication unit and the next in the system and wherein each connecting unit includes control logic for generating and receiving the control messages and for controlling the connecting units to cause the data packets to bypass an external port of said connecting unit when an active communication unit is not coupled to that external port.

11. A system according to claim 10 wherein the connecting units provide a data path for packets in each of two directions around the ring.

12. A system according to claim 10 wherein for each connecting unit the control logic receives control messages indicating an identification number and to provide control messages modified to indicate an increase in the identification number.

13. A system according to claim 10 wherein for each connecting unit the control logic receives a count which represent a number of active communication units and provides a count which is incremented only if an active communication unit is coupled to the third external port of the respective connecting unit.

14. A system according to claim 10 wherein each communication unit accommodates an interface which is coupled to a single respective external port of a connecting unit and provides for the communication of data packets between the respective communication unit and the connecting unit having said respective port.

15. A system according to claim 14 wherein the interface provides for the storage of a respective identification number.

16. A system according to claim 14 wherein said interface is a modular unit removable from the respective communication unit.

17. A system according to claim 14 wherein for connecting an external port of a connecting unit to an external port of another connecting unit there is provided a connecting cable which co-operates with a signal state of said control messages to indicate which end of the cable is connected to a respective one of said first and second external ports.

18. A connecting unit for use in a system comprising a plurality of network communication units having a cascade connection including said connecting unit, the connecting unit comprising:
 (i) three external ports consisting of a first, second and third port, each port of the connecting unit being configured to forward and receive data packets and to separately forward and receive point-to-point control messages;
 (ii) multiplexers for providing a respective data path for packets to each one of the ports from either of the other two ports selectively; and
 (iii) control logic for determining from said point-to-point control messages for each port a link status and for controlling the multiplexers to bypass any one of said ports when the respective link status indicates that data packets are not to be received from that port.

19. A connecting unit according to claim 18 wherein there is one of said multiplexers for each port and each such multiplexer is controllable to direct to the respective port data packets from either one of the other two ports selectively and wherein the multiplexers bypass a port by preventing supply of packets from that port to the other two respective ports.

20. A connecting unit according to claim 18 wherein each port is arranged to transmit and receive control messages so as to determine the link status of the respective port.

21. A connecting unit according to claim 20 wherein each port has respective lines for the transmission and reception of the control messages separately from the data packets.

22. A connecting unit according to claim 20 wherein the control logic determines that data packets are not to be received from a port when the control logic determines an absence of control messages received by that port.

23. A connecting unit according to claim 20 wherein the control messages include a field for representing the link status as if it were false.

24. A connecting unit for use in a system comprising a plurality of network communication units having a cascade connection including said connecting unit, the connecting unit comprising:
  (i) three external ports consisting of a first, second and third port, each port of the connecting unit configured to forward and receive data packets and to transmit and receive point-to-point control messages separately from the data packets from the connecting unit;
  (ii) multiplexers for providing a respective data path for packets to each one of the ports from either of the other two ports selectively; and
  (iii) control logic for determining for each port a link status depending on whether control messages are received by the port and for controlling the multiplexers to bypass any one of said ports when the link status corresponds to the absence of reception of control messages at that port.

25. A connecting unit according to claim 24 wherein there is one of said multiplexers for each port and each such multiplexer is controllable to direct to the respective port data packets from either one of the other two ports selectively and wherein the multiplexers bypass a port by preventing supply of packets from that port to the other two respective ports.

26. A connecting unit according to claim 24 wherein the control messages include a field for causing the control logic to treat the reception of control messages as the absence of control messages.

27. A connecting unit according to claim 24 wherein the control logic is arranged to receive by way of the first port control messages indicating an identification number and to provide from the second port control messages modified to indicate an increase in the identification number.

28. A connecting unit according to claim 24 wherein the control logic is arranged to receive by way of the first port control messages including a count which represents a number of active communication units and to provide from the second port control messages including a count which is incremented if an active communication unit is coupled to the third port.

29. A connecting unit for use in a system comprising a plurality of network communication units having a cascade connection including said connecting unit, the connecting unit comprising:
  (i) three external ports consisting of a first, second and third port, each port of the connecting unit configured to forward and receive addressed data packets and to transmit and receive point-to-point control messages separately from the data packets from the connecting unit;
  (ii) for each port, a respective multiplexer which is controllable to direct to the respective port data packets from either one of the other two ports selectively whereby the multiplexers bypass a port by preventing supply of packets from that port to the other two respective ports; and
  (iii) control logic for determining for each port a link status depending on whether control messages are received by the port and for controlling the multiplexers to bypass any one of said ports when the link status corresponds to the absence of reception of control messages at that port.

30. A connecting unit according to claim 29 wherein the control messages include a field for causing the control logic to treat the reception of control messages as the absence of control messages.

31. A connecting unit according to claim 29 wherein the control logic is arranged to receive by way of the first port control messages including a count which represents a number of active communication units and to provide from the second port control messages including a count which is incremented if an active communication unit is coupled to the third port.

* * * * *